United States Patent
Barr, Jr.

(10) Patent No.: US 8,811,113 B2
(45) Date of Patent: Aug. 19, 2014

(54) METHOD OF SUMMING DUAL-SENSOR TOWED STREAMER SIGNALS USING SEISMIC REFLECTION VELOCITIES

(75) Inventor: Frederick James Barr, Jr., Pearland, TX (US)

(73) Assignee: PGS Geophysical AS, Oslo (NO)

( * ) Notice: Subject to any disclaimer, the term of this patent is extended or adjusted under 35 U.S.C. 154(b) by 841 days.

(21) Appl. No.: 12/221,255

(22) Filed: Aug. 1, 2008

(65) Prior Publication Data
US 2010/0027375 A1 Feb. 4, 2010

(51) Int. Cl.
*G01V 1/38* (2006.01)
*G01V 1/32* (2006.01)

(52) U.S. Cl.
CPC .. *G01V 1/38* (2013.01); *G01V 1/32* (2013.01); *G01V 2210/61* (2013.01)
USPC .................................. 367/24; 367/15; 367/21

(58) Field of Classification Search
USPC ...................................................... 367/15, 21
See application file for complete search history.

(56) References Cited

U.S. PATENT DOCUMENTS

| | | | |
|---|---|---|---|
| 4,437,175 A | 3/1984 | Berni | |
| 6,314,317 B1 * | 11/2001 | Willis | 604/20 |
| 6,314,371 B1 * | 11/2001 | Monk | 702/17 |
| 7,355,924 B2 * | 4/2008 | Zimmerman et al. | 367/88 |
| 7,359,283 B2 * | 4/2008 | Vaage et al. | 367/24 |
| 7,397,427 B1 * | 7/2008 | Rhoads et al. | 342/442 |
| 7,551,515 B2 * | 6/2009 | Christie et al. | 367/21 |
| 2008/0033655 A1 * | 2/2008 | Ozbek et al. | 702/17 |

FOREIGN PATENT DOCUMENTS

GB 2442854 4/2008

OTHER PUBLICATIONS

F.K. Levin, "Apparent velocity from dipping interface reflections", Geophysics, vol. 36, No. 3, Jun. 1971, p. 510-516.
United Kingdom Patent Office Search Report, Nov. 3, 2009.

* cited by examiner

*Primary Examiner* — Krystine Breier

(57) ABSTRACT

A merged particle velocity signal is generated by merging a recorded vertical particle velocity signal, scaled in an upper frequency range using a time-dependent arrival angle as determined by velocity analysis, with a simulated particle velocity signal, calculated in a lower frequency range from a recorded pressure signal using a time-varying filter based on the time-dependent arrival time. Combined pressure and vertical particle velocity signals are generated by combining the recorded pressure and merged velocity signals.

18 Claims, 13 Drawing Sheets

┌─ 11
Generate merged particle velocity signal by merging recorded vertical particle velocity signal, scaled in upper frequency range using time-dependent arrival angle as determined by velocity analysis, with simulated particle velocity signal, calculated in lower frequency range from recorded pressure signal using time-varying filter based on time-dependent arrival angle ┌─ 12
Generate combined pressure and vertical particle velocity signals by combining recorded pressure and merged particle velocity signals

METHOD OF SUMMING DUAL-SENSOR TOWED STREAMER SIGNALS USING SEISMIC REFLECTION VELOCITIES

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting. More particularly, the invention relates to the field of noise attenuation in dual-sensor marine seismic streamer data.

2. Description of the Related Art

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. A well-known technique of geophysical prospecting is a seismic survey. In a land-based seismic survey, a seismic signal is generated on or near the earth's surface and then travels downward into the subsurface of the earth. In a marine seismic survey, the seismic signal may also travel downward through a body of water overlying the subsurface of the earth. Seismic energy sources are used to generate the seismic signal which, after propagating into the earth, is at least partially reflected by subsurface seismic reflectors. Such seismic reflectors typically are interfaces between subterranean formations having different elastic properties, specifically sound wave velocity and rock density, which lead to differences in acoustic impedance at the interfaces. The reflected seismic energy is detected by seismic sensors (also called seismic receivers) at or near the surface of the earth, in an overlying body of water, or at known depths in boreholes and recorded.

The resulting seismic data obtained in performing a seismic survey is processed to yield information relating to the geologic structure and properties of the subterranean formations in the area being surveyed. The processed seismic data is processed for display and analysis of potential hydrocarbon content of these subterranean formations. The goal of seismic data processing is to extract from the seismic data as much information as possible regarding the subterranean formations in order to adequately image the geologic subsurface. In order to identify locations in the Earth's subsurface where there is a probability for finding petroleum accumulations, large sums of money are expended in gathering, processing, and interpreting seismic data. The process of constructing the reflector surfaces defining the subterranean earth layers of interest from the recorded seismic data provides an image of the earth in depth or time.

The image of the structure of the Earth's subsurface is produced in order to enable an interpreter to select locations with the greatest probability of having petroleum accumulations. To verify the presence of petroleum, a well must be drilled. Drilling wells to determine whether petroleum deposits are present or not, is an extremely expensive and time-consuming undertaking. For that reason, there is a continuing need to improve the processing and display of the seismic data, so as to produce an image of the structure of the Earth's subsurface that will improve the ability of an interpreter, whether the interpretation is made by a computer or a human, to assess the probability that an accumulation of petroleum exists at a particular location in the Earth's subsurface.

The appropriate seismic sources for generating the seismic signal in land seismic surveys may include explosives or vibrators. Marine seismic surveys usually employ a submerged seismic source towed by a ship and periodically activated to generate an acoustic wavefield. The seismic source generating the wavefield may be of several types, including a small explosive charge, an electric spark or arc, a marine vibrator, and, typically, a gun. The seismic source gun may be a water gun, a vapor gun, and, most often, an air gun. A marine seismic source usually consists not of a single source element, but of a spatially-distributed array of source elements. This arrangement is particularly true for air guns, currently the most common form of marine seismic source. In an air gun array, each air gun stores and quickly releases a different volume of highly compressed air, forming a short-duration impulse.

The appropriate types of seismic sensors include particle velocity sensors, particularly in land surveys, and water pressure sensors, particularly in marine surveys. Sometimes particle displacement sensors, particle acceleration sensors, or pressure gradient sensors are used in place of or in addition to particle velocity sensors. Particle velocity sensors and water pressure sensors are commonly known in the art as geophones and hydrophones, respectively. Seismic sensors may be deployed by themselves, but are more commonly deployed in sensor arrays. Additionally, pressure sensors and particle velocity sensors may be deployed together in a marine survey, collocated in pairs or pairs of arrays.

In a conventional marine seismic survey, a seismic survey vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. Seismic streamers, also called seismic cables, are elongate cable-like structures towed in the body of water by the seismic survey vessel that tows the seismic source or by another seismic survey ship. Usually, a plurality of seismic streamers is towed behind a seismic vessel.

When the air-gun array is fired, an impulse sound wave travels down through the water and into the earth. At each interface where the type of rock changes, a portion of that sound wave is reflected back toward the surface and back into the water layer. After the reflected wave reaches the streamer cable, the wave continues to propagate to the water/air interface at the water surface, from which the wave is reflected downwardly, and is again detected by the hydrophones in the streamer cable. The water surface is a good reflector and the reflection coefficient at the water surface is nearly unity in magnitude and is negative in sign for pressure waves. The pressure waves reflected at the surface will thus be phase-shifted 180 degrees relative to the upwardly propagating waves. The downwardly propagating wave recorded by the receivers is commonly referred to as the surface reflection or the "ghost" signal. Because of the surface reflection, the water surface acts like a filter, which creates spectral notches in the recorded signal, making it difficult to record data outside a selected bandwidth. Because of the influence of the surface reflection, some frequencies in the recorded signal are amplified and some frequencies are attenuated.

Maximum attenuation of the pressure wave occurs at frequencies for which the propagation distance between the detecting hydrophone and the water surface is equal to one-half wavelength. Maximum amplification occurs at frequencies for which the propagation distance between the detecting hydrophone and the water surface is one-quarter wavelength. The wavelength of the acoustic wave is equal to the velocity divided by the frequency, and the velocity of an acoustic wave in water is about 1500 meters/second. Accordingly, the location in the frequency spectrum of the resulting spectral notch is readily determinable. For example, for a seismic streamer at a depth of 7 meters, and waves with vertical incidence, maximum attenuation occurs at a frequency of about 107 Hz and maximum amplification occurs at a frequency of about 54 Hz.

A particle motion sensor, such as a geophone, has directional sensitivity, whereas a pressure sensor, such as a hydrophone, does not. Accordingly, the upgoing wavefield signals detected by a geophone and hydrophone located close together will be in phase, while the downgoing wavefield signals will be recorded 180 degrees out of phase. Various techniques have been proposed for using this phase difference to reduce the spectral notches caused by the surface reflection and, if the recordings are made on the seafloor, to attenuate water borne multiples. It should be noted that an alternative to having the geophone and hydrophone co-located, is to have sufficient spatial density of sensors so that the respective wavefields recorded by the hydrophone and geophone can be interpolated or extrapolated to produce the two wavefields at the same location.

It is well known in the art that pressure and particle motion signals can be combined to derive both the up-going and the down-going wavefield. For sea floor recordings, the up-going and down-going wavefields may subsequently be combined to remove the effect of the surface reflection and to attenuate water borne multiples in the seismic signal. For towed streamer applications, however, the particle motion signal has been regarded as having limited utility because of the high noise level in the particle motion signal. However, if particle motion signals could be provided for towed streamer acquisition, the effect of the surface reflection "ghosts" could be removed from the data.

It has been difficult to achieve the same bandwidth in the motion sensor data as in the pressure sensor data, however, because of the noise induced by vibrations in the streamer, which is sensed by the particle motion sensors. The noise is, however, mainly confined to lower frequencies. One way to reduce the noise is to have several sensors, closely spaced apart from one another, and wired in series or in parallel. This approach, however, does not always reduce the noise enough to yield a signal-to-noise ratio satisfactory for further seismic processing.

Conventional 3D marine seismic acquisition by towed streamer usually results in asymmetrical spatial sampling and fold between inline and cross-line directions. The sampling density is denser in the inline direction (parallel to the towed streamers) than in the cross-line direction (perpendicular to the towed streamers). The asymmetry is due to a wider spacing between receivers in separate streamers than between receivers in the same streamer. This asymmetry can lead to aliasing of the sampled data in the cross-line direction. The aliasing interferes with efforts to combine the pressure and particle motion signals to derive the up-going and down-going wavefields.

Thus, a need exists for a method for attenuating low frequency noise found in vertical particle velocity sensor signals when combining pressure sensor and vertical particle velocity sensor signals in dual-sensor seismic streamer data which handles inline and cross-line aliasing by accounting for non-vertical angles of incidence, also known as arrival angles.

BRIEF SUMMARY OF THE INVENTION

The invention is a method for attenuating low frequency noise in dual-sensor towed streamer signals by combining pressure signals and vertical particle velocity signals. A merged particle velocity signal is generated by merging a recorded vertical particle velocity signal, scaled in an upper frequency range using a time-dependent arrival angle as determined by velocity analysis, with a simulated particle velocity signal, calculated in a lower frequency range from a recorded pressure signal using a time-varying filter based on the time-dependent arrival time. Combined pressure and vertical particle velocity signals are generated by combining the recorded pressure and merged particle velocity signals.

BRIEF DESCRIPTION OF THE DRAWINGS

The invention and its advantages may be more easily understood by reference to the following detailed description and the attached drawings, in which.

Figure 1:
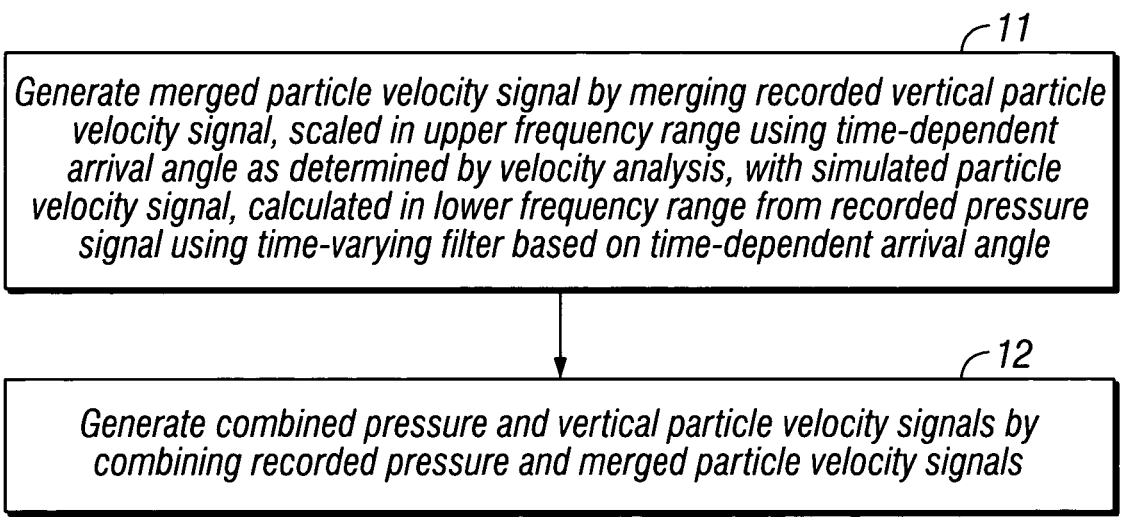
FIG. 1 is a flowchart illustrating an embodiment of the invention for combining pressure signals and vertical particle velocity signals in dual-sensor towed streamers.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

A dual-sensor seismic streamer records the seismic wavefield using both pressure and vertical particle velocity sensors, allowing a subsequent decomposition of the total wavefield into upgoing and downgoing components. The error in the estimate of these components is increased by noise on either sensor, but the noise is typically greater in the vertical particle velocity sensor. Undesirable low-frequency noise on the vertical particle velocity sensor can be removed before decomposition by replacing the lower frequency portion of the vertical particle velocity data with a predicted vertical particle velocity signal calculated from the pressure signal. This prediction takes into account factors which include the properties of the propagation medium, the incidence angle of the incoming energy and the "ghost" which arises from reflection of the seismic wavefield at the sea surface. This replacement process reduces the contribution from the noisier vertical particle velocity sensor.

This low frequency replacement process is described more fully in U.S. Pat. No. 7,359,283 B2, of Svein Vaage, et al.; entitled "System for Combining Signals of Pressure Sensors and Particle Motion Sensors in Marine Seismic Streamers"; issued Apr. 15, 2008; and assigned to an affiliated company of the assignee of the present invention. Vaage et al. describe a method for combining signals of a pressure sensor and a particle motion sensor recorded in a marine seismic streamer to reduce noise in the combined pressure sensor signal and particle motion sensor signal, the recorded pressure sensor signal having a bandwidth comprising a first frequency range and a second frequency range, the first frequency range being at lower frequencies than the frequencies of the second frequency range, and the recorded particle motion sensor signal having a bandwidth comprising at least the second frequency range. The method comprises calculating a particle motion sensor signal in the first frequency range from the recorded pressure sensor signal, thereby generating a simulated particle motion sensor signal in the first frequency range; merging the simulated particle motion sensor signal only in the first frequency range with the recorded particle motion sensor signal in the second frequency range to generate a merged particle motion sensor signal having substantially the same bandwidth as the bandwidth of the recorded pressure sensor signal, and combining the recorded pressure sensor signal and the merged particle motion sensor signal for further processing.

The invention overcomes aliasing problems by providing a method that performs all operations on corresponding pairs of pressure and vertical particle velocity traces recorded at each streamer receiver station. Thus, the method of the invention does not require modifying the acquisition recording geometry to avoid aliasing.

The invention employs the combined signals of pressure sensors (typically hydrophones) and vertical particle velocity sensors (typically geophones) located in seismic streamers. The combined signals can then be utilized to generate the up- and down-going wavefield components, which are useful for further seismic processing, such as attenuation of multiples in marine seismic data. Since a recorded vertical particle velocity signal is often contaminated by low frequency noise due to the vibrations in a towed streamer, the signal-to-noise ratio for the combined signals would be poor. The vertical particle velocity signal may be calculated from the pressure sensor signal within a given frequency range if the spectrum of the pressure sensor signal has a satisfactory signal-to-noise ratio within this frequency range (and has no notches within this frequency range) and if the depth of the pressure and vertical particle velocity sensors is known. If the depth to the sensors is unknown, the depth can be calculated from the frequency of the spectral notches introduced by the surface reflection, a process which is well known in the art.

The low frequency part of the vertical particle velocity signal will often need to be replaced because it has a low signal-to-noise ratio. The corresponding portion of the pressure signal to be used for calculating the particle motion signal will typically have a good signal-to-noise ratio in this low frequency range. Therefore, the depth of the pressure sensor is preferably chosen so that the frequency of the first spectral notch in the pressure signal caused by the surface reflection is higher than the low frequency range in which the vertical particle velocity signal is calculated and substituted.

The method of the invention is particularly useful for towed marine seismic streamers, since the vibration of a towed streamer adds a significant amount of noise to the signal of the particle motion sensor. Thus the method of the invention will be illustrated in terms of towed streamers. The invention provides a means to perform the low frequency replacement computation of a towed-streamer vertical particle velocity signal when the shooting geometry is such that the common-shot gathers are spatially aliased in one or more dimension(s).

The method of the invention is to compute the non-vertical arrival angles, $\phi(t)$, at each dual-sensor receiver station, as a function of recording time t, from the reflection events' apparent velocities $v_{app}(t)$ in the source-to-receiver offset-time (x,t) domain, as determined from velocity analyses. If the recorded particle velocity signal g(t) is not corrupted by tow noise, then each time sample of that recorded vertical particle velocity signal is simply scaled by the factor $$\frac{1}{\cos[\phi(t)]}$$

prior to combining it with its corresponding recorded pressure signal h(t). If, however, the recorded vertical particle velocity signal g(t) is corrupted by tow noise, then the invention provides an efficient method for handling the low frequency replacement computation of the vertical particle velocity signal.

The invention determines the vertical arrival angle as a function of time at each streamer receiver station. The time dependent arrival angle is used to both scale the recorded vertical particle velocity signal in an upper frequency range and to calculate a simulated vertical particle velocity signal from the recorded pressure signal in the lower frequency range. Using a time-dependent arrival angle avoids the aliasing problems of prior methods. Although the time-dependent arrival angle could be applied in the time domain, the invention uses an embodiment in the frequency domain that is much more computationally efficient.

Figure 2:
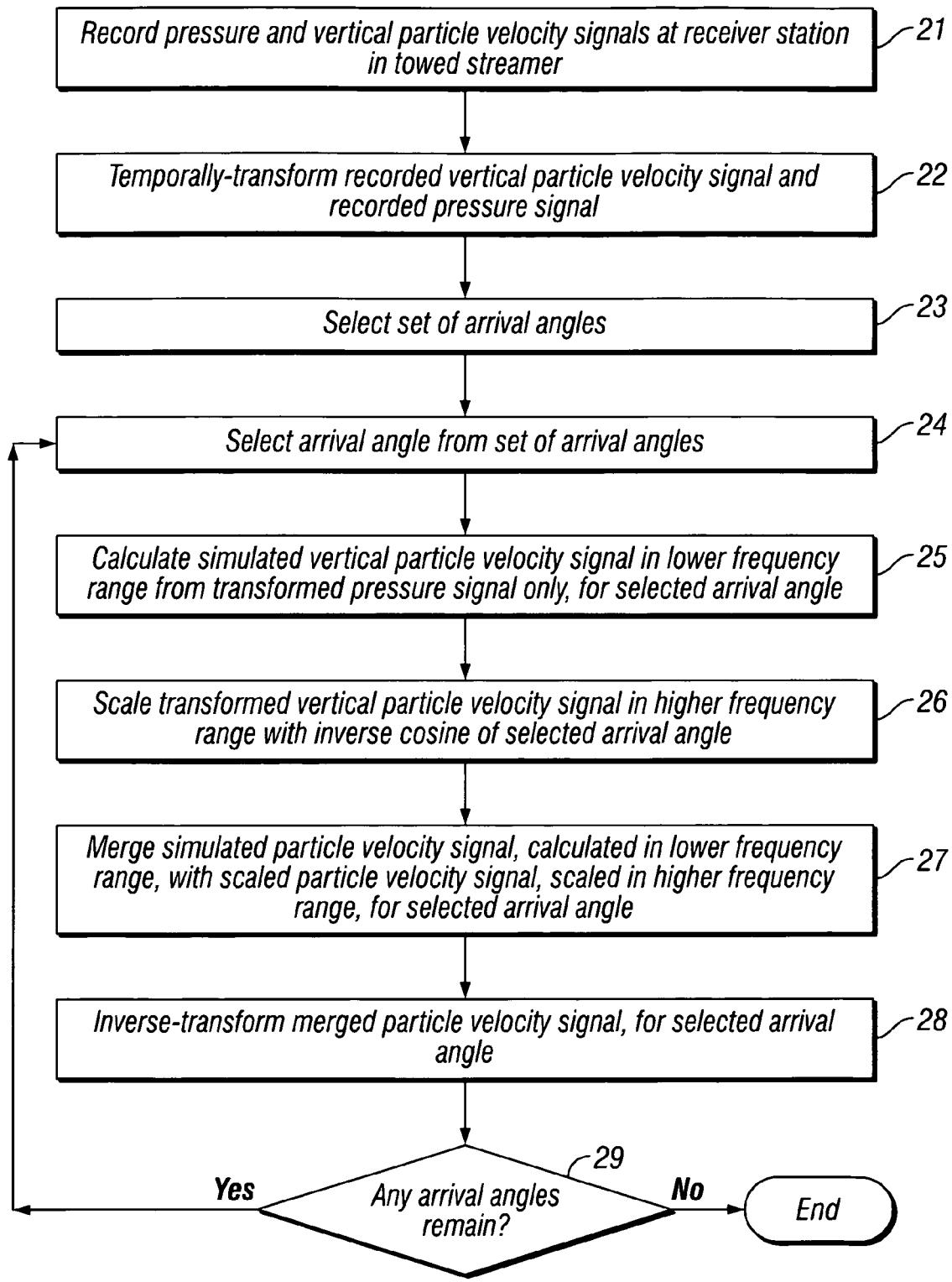
FIG. 2 is a flowchart illustrating an embodiment of the invention for merging a vertical particle velocity signal scaled in an upper frequency range with a particle velocity signal, calculated from a recorded pressure signal in a lower frequency range, for a set of arrival angles.
Figure 3:
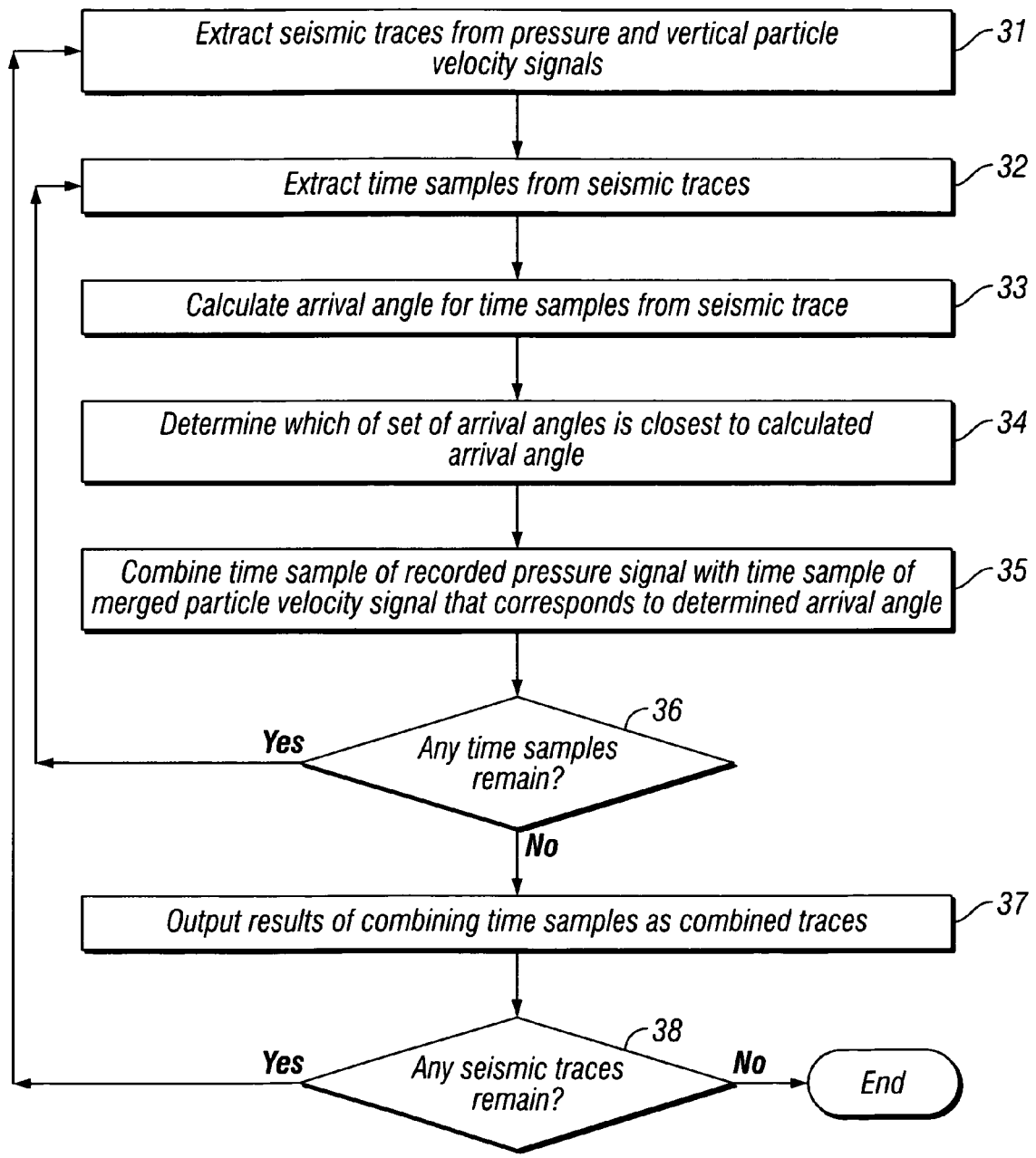
FIG. 3 is a flowchart illustrating an embodiment of the invention for combining a recorded pressure signal with the scaled and merged particle velocity signal from FIG. 2, corresponding to an arrival angle determined from velocity analysis.
Figure 4:
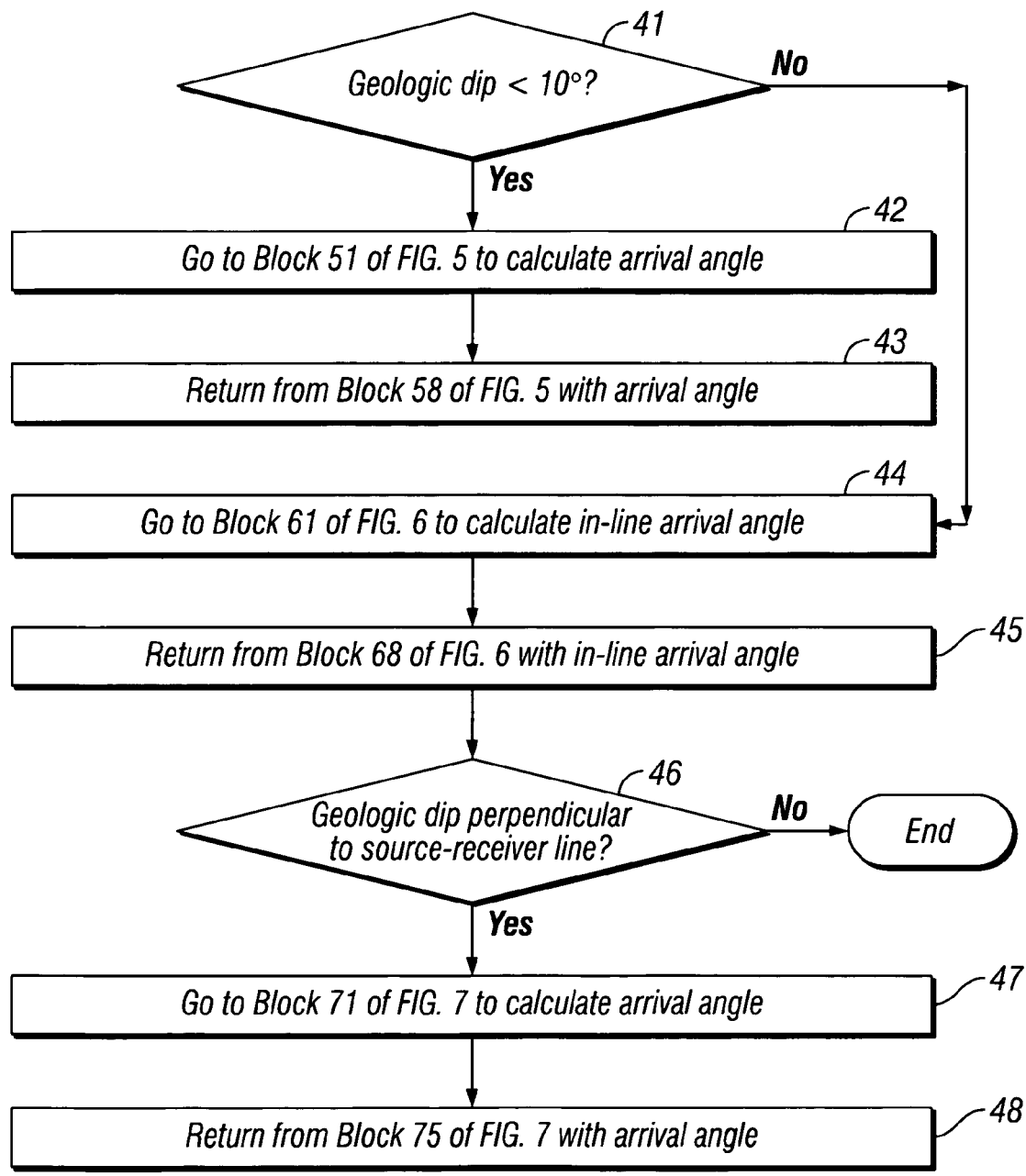
FIG. 4 is a flowchart illustrating an embodiment of the invention for determining arrival angles for different types of geologic dip.
Figure 5:
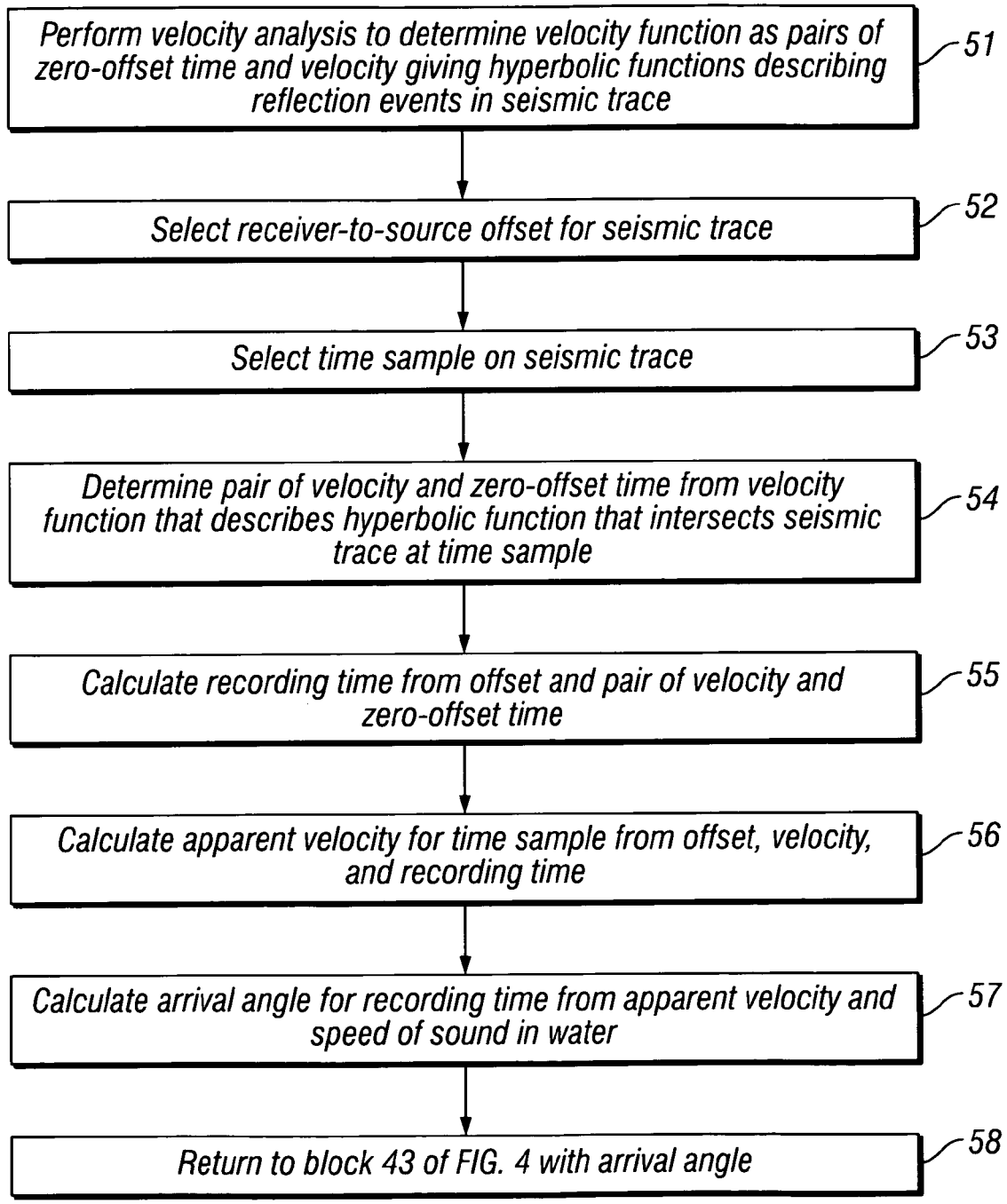
FIG. 5 is a flowchart illustrating an embodiment of the invention for determining arrival angles for geologic dip less than 10°.
Figure 6:
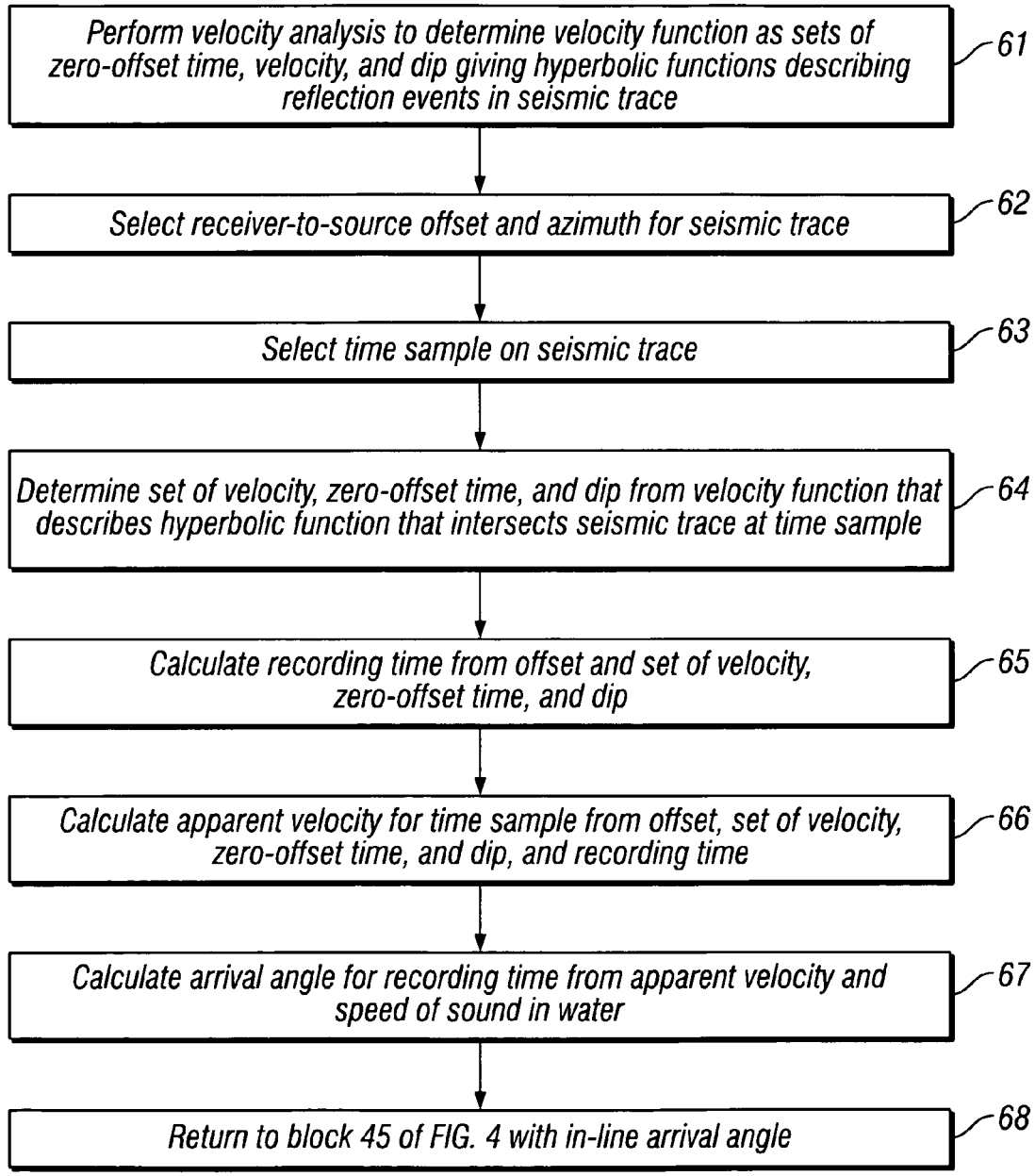
FIG. 6 is a flowchart illustrating an embodiment of the invention for determining an arrival angle for geologic dip greater than 10°.
Figure 7:
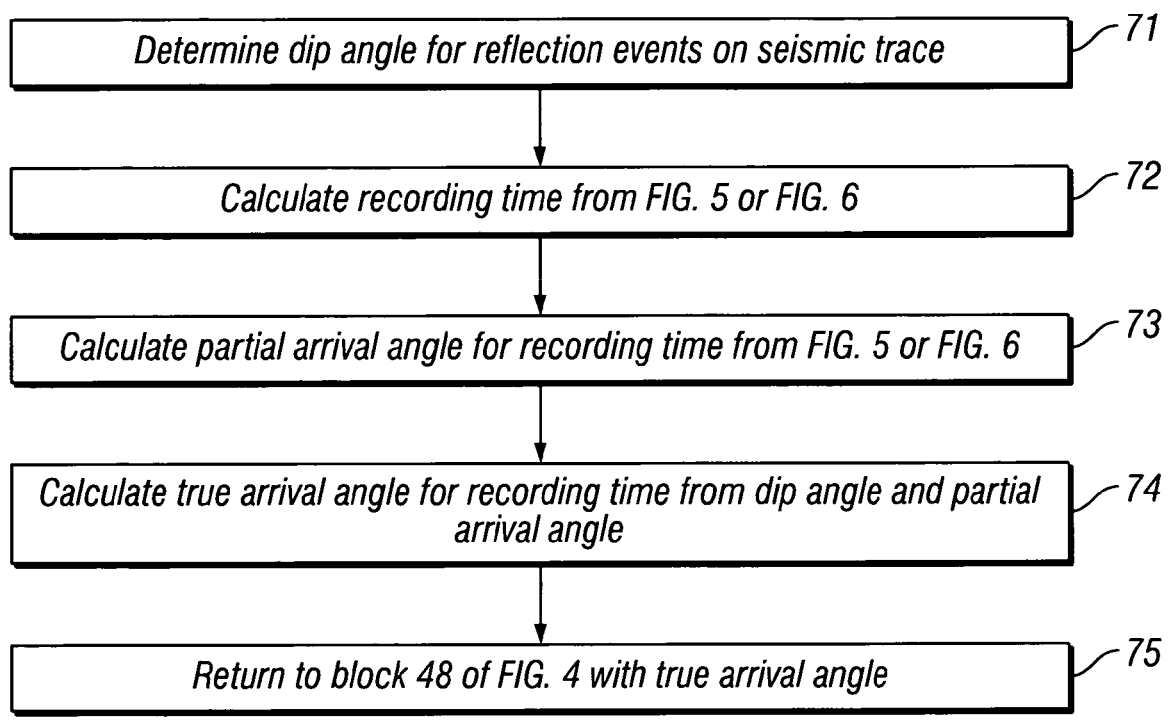
FIG. 7 is a flowchart illustrating an embodiment of the invention for determining an arrival angle for geologic dips perpendicular to the source-to-receiver line.

FIGS. 1-7 show flowcharts illustrating embodiments of the invention for attenuating low frequency noise in dual-sensor seismic streamer data. FIG. 1 is a flowchart illustrating a general description of the invention. FIGS. 2-3 are flowcharts further illustrating particular portions of the invention as described in FIG. 1. FIG. 4 is a flowchart illustrating the determination of appropriate velocity analyses for determining arrival angles. FIGS. 5-7 are flowcharts illustrating the different types of velocity analysis appropriate for determining arrival angles for different types of geologic dip in FIG. 4.

FIG. 1 is a flowchart illustrating an embodiment of the invention for combining pressure signals and vertical particle velocity signals in dual-sensor towed streamers.

At block 11, a merged vertical particle velocity signal is generated by merging a recorded vertical particle velocity signal, scaled in an upper frequency range using a time-dependent arrival angle as determined by velocity analysis, with a simulated particle velocity signal, calculated in a lower frequency range from a recorded pressure signal using a time-varying filter based on the time-dependent arrival angle.

At block 12, combined pressure and vertical particle velocity signals are generated by combining the recorded pressure and merged particle velocity signals from block 11.

FIG. 2 is a flowchart illustrating an embodiment of the invention for merging a vertical particle velocity signal scaled in an upper frequency range with a particle velocity signal, calculated from a recorded pressure signal in a lower frequency range, for a set of arrival angles. FIG. 2 illustrates in more detail the portion of the invention discussed in block 11 of FIG. 1, above.

At block 21, pressure signals $h^{recd}(t) \equiv h^{recd}(x,t)$ and vertical particle velocity sensor signals $g^{recd}(t) \equiv g^{recd}(x,t)$ are recorded at a receiver station in a dual-sensor towed streamer. It is within the scope of the invention that other types of seismic sensors be employed in the invention. Thus, for generality, the recorded signals will be referred to as pressure signals rather than pressure sensor signals and as particle velocity signals rather than particle velocity sensor signals. The other types of seismic sensors could include, but are not limited to, multi-directional particle velocity sensors, particle displacement sensors, particle acceleration sensors, or pressure gradient sensors being used in place of or in addition to vertical particle velocity sensors. The pressure and vertical particle velocity sensors may be deployed by themselves, but are more commonly deployed in sensor arrays. Additionally, the pressure sensors and particle velocity sensors are typically positioned together in the streamers, collocated in pairs or pairs of arrays.

The method of the invention employs particle motion sensors that are responsive to motions of the particles of the medium (water) to which the motion sensors are coupled. In general, particle motion sensors may be responsive to the displacement of the particles, the velocity of the particles, or the acceleration of the particles in the medium. Particle velocity sensors are typically employed and so are used to illustrate the present invention. If motion sensors are used which are responsive to position, the position signal can be differentiated to convert it to a velocity signal, by computational means well known in the art. If motion sensors are used which are responsive to acceleration (accelerometers), the acceleration signal can be integrated to convert it to a velocity signal, by computational means well known in the art.

At block 22, the recorded pressure signals h(t) and vertical particle velocity signals g(t) from block 21 are temporally-transformed from a time domain to yield H(ω) and G(ω), respectively in a frequency domain. In the following discussion, signals in the time domain are denoted by lower case letters, while the same signals in the frequency domain are denoted by the corresponding capital letters. Here, ω is radial frequency in radians/second, equal to 2πf for temporal frequency f in Hertz. In an illustrated embodiment of the invention, the calculations (and following operations) are done in the frequency domain. Thus, the transformations can be done by any well-known temporal transform, such as, for example, Fourier transforms. However, this choice of transform is for convenience only and is not meant to be a limitation of the invention.

Additionally, the transformed pressure and particle velocity signals, H(ω) and G(ω), respectively, are corrected for relative differences in the instrument transfer functions, which correspond to instrument impulse responses in the time domain. These corrections could either be correcting the amplitude and phase of the pressure signals to match the particle velocity signals, or, in an alternative embodiment, correcting the particle velocity signals to match the pressure signals, or, in a further alternative embodiment, correcting both data sets to a common basis. Correcting for relative differences in instrument impulse responses is well known in the art. Finally, an amplitude scaling equal to the acoustic impedance of the water is preferably applied to the particle velocity signals to correct for the relative differences in amplitudes of pressure and particle velocity. This is also well known in the art.

At block 23, a set of arrival angles $\{\phi_j\}$ is selected. The set of arrival angles $\{\phi_j\}$ is selected to cover the range of arrival angles, measured from vertical, expected to be encountered for reflection wavelets in the recorded pressure signals $h^{recd}(t)$ and vertical particle velocity signals $g^{recd}(t)$ obtained in block 21. The set of arrival angles $\{\phi_j\}$ may be designated as the set $\{\phi_j, \text{ for } j=0, 1, 2, \ldots, N\}$ for some selected total number of arrival angles equal to N+1. In one example embodiment with N=60, a set of 61 arrival angles $\phi_j$ are equal to the set $\{\phi_j\} = \{0°, 1°, 2°, \ldots, 60°\}$, corresponding to j=0, 1, 2, ..., 60, respectively.

At block 24, an arrival angle $\phi_j$ is selected from the set of arrival angles $\{\phi_j\}$ in block 23. Preferably, the arrival angles are selected in a systematic manner, such as proceeding sequentially through the arrival angles $\phi_j$ in the order j=0, 1, 2, ..., N.

At block 25, a simulated particle velocity signal $G_j^{calc}(\omega)$ is calculated in a lower frequency range from a transformed pressure signal H(ω,) from block 22, without using the recorded vertical particle velocity signal, for the arrival angle $\phi_j$ selected in block 24. The lower-frequency portion of the particle velocity sensor's frequency spectrum $G_j^{calc}(\omega)$ can be calculated from the corresponding pressure sensor's frequency spectrum H(ω). This calculation can be done, for instance, by using the expression:

$$G_j^{calc}(\omega) = \frac{1+Z_j}{1-Z_j} H(\omega), \qquad (1)$$

in the lower frequency range. In Equation (1), $Z_j$ is a time delay operator, which can be expressed by:

$$Z_j = \exp[-i\omega\tau_j] = \cos(\omega\tau_j) - i\sin(\omega\tau_j),$$

where $\tau_j$ is ghost reflection time delay in seconds given by:

$$\tau_j = \cos(\phi_j)\frac{2D}{c}.$$

Here, $i=\sqrt{-1}$ is the imaginary unit, $\phi_j$ is the arrival angle selected in block 24, D is receiver depth in meters and c is speed of sound in the medium in meters/sec. In water, c is about 1500 m/s. The depth D may be determined by any means known in the art, such as by a depth sensor or a calculation.

For each value of arrival angle $\phi_j$, Equation (1) is evaluated for values of frequency $\omega$ corresponding to frequency f ranging from about 1 Hz to a value less than that which causes $(1-Z_j)$ to equal zero, which is the frequency of the first spectral notch in the pressure signal's spectrum.

At block 26, the transformed vertical particle velocity signal $G(\omega)$ from block 22 is scaled in an upper frequency range. The transformed vertical particle velocity signal $G(\omega)$ from block 22 is scaled in amplitude to compensate for the directional sensitivity of vertical particle velocity sensors. In particular, the transformed vertical particle velocity signal $G(\omega)$ is scaled in the upper frequency range by being divided by the cosine of the arrival angle $\phi_j$ selected in block 24, generating a scaled particle velocity signal $G_j^{scal}(\omega)$. Thus:

$$G_j^{scal}(\omega) = \frac{G(\omega)}{\cos(\phi_j)}, \quad (2)$$

in the upper frequency range. In a particular embodiment, the lower frequency range from block 25 and the upper frequency range here in block 26 combine to equal the total bandwidth of the transformed pressure signal $H(\omega)$ from block 22.

At block 27, the simulated particle velocity signal $G_j^{calc}(\omega)$, calculated in the lower frequency range in block 25, is merged with the scaled particle velocity signal $G^{scal}(\omega)$, scaled in the upper frequency range in block 26, to generate a merged particle velocity signal $G_j^{merg}(\omega)$ having substantially the same bandwidth as the bandwidth of the recorded pressure signal $H(\omega)$, for the arrival angle $\phi_j$ selected in block 24. In a particular embodiment, this merging is done as described above in U.S. Pat. No. 7,359,283 B2 by Vaage et al.

At block 28, the merged particle velocity signal $G_j^{merg}(\omega)$ from block 27 is inverse-transformed from the frequency domain to yield $g_j^{merg}(t)$ back in the time domain. As above, this inverse temporal transformation can be done by any well-known transforms, such as, for example, inverse Fourier transforms. However, this choice of transform is for convenience only and is not meant to be a limitation of the invention.

At block 29, it is determined if any arrival angles $\phi_j$ remain from the set of arrival angles $\{\phi_j\}$ selected in block 23. If any arrival angles $\phi_j$ remain, then the process returns to block 24 to select another arrival angle $\phi_j$. If no arrival angles $\phi_j$ remain, then the process ends.

FIG. 3 is a flowchart illustrating an embodiment of the invention for combining a recorded pressure signal with the scaled and merged particle velocity signal from FIG. 2, corresponding to an arrival angle determined from velocity analysis. FIG. 3 illustrates in more detail the portion of the invention discussed in block 12 of FIG. 1, above.

At block 31, a pressure trace and a vertical particle velocity trace are extracted from the pressure signals h(t) and vertical particle velocity signals g(t, respectively) recorded in block 21 of FIG. 2. The seismic traces correspond to seismic data acquired at each sensor location in the dual-sensor seismic streamers.

At block 32, time samples are extracted at a recorded time t in the seismic traces extracted in block 31 from the pressure signals h(t) and vertical particle velocity signals g(t).

At block 33, an arrival angle $\phi(t)$ is calculated at the recorded time in the time samples extracted in block 32 from the seismic traces extracted in block 31. In one embodiment of the invention, the calculation of the arrival angle $\phi(t)$ is done by way of velocity analysis. In a particular embodiment, the arrival angle $\phi(t)$ is calculated by means of different versions of velocity analysis, depending upon the size and orientation of the dip angle. This velocity analysis is described in further detail in the discussion with regard to the flowchart in FIG. 4.

At block 34, it is determined which arrival angle $\phi_j$ of the set of arrival angles $\{\phi_j\}$ from block 23 of FIG. 2 is closest to the calculated arrival angle $\phi(t)$ calculated in block 33.

At block 35, a time sample of the recorded pressure signal h(t) is combined with a time sample of the corresponding merged particle velocity signal $g_j^{merg}(t)$ from block 28 of FIG. 2, that corresponds to the arrival angle $\phi_j$ determined in block 34. In a particular embodiment, the combining of time samples refers to the construction of up-going and down-going wavefield components from the appropriate combination of the time samples from pressure signals and particle velocity signals. In particular, the up-going wavefield component may be calculated from the appropriate addition of the pressure signals and vertical particle velocity signals, while the down-going wavefield component may be calculated from the appropriate subtraction of the particle velocity signal from the pressure signal, as is well-known in the art of seismic data processing.

At block 36, it is determined if more time samples from block 32 exist in the seismic trace from block 31. If more time samples exist, then the process returns to block 32 to extract another time sample. If no more time samples exist, then the process continues on to block 37.

At block 37, results of combining the time samples in block 35 are output as combined traces.

At block 38, it is determined if more seismic traces from block 31 exist in the pressure signals and vertical particle velocity signals. If more seismic traces exist, then the process returns to block 31 to extract another seismic trace. If no more seismic traces, then the process ends.

FIG. 4 is a flowchart illustrating an embodiment of the invention for determining arrival angles for different types of geologic dip. FIG. 4 illustrates in more detail the portion of the invention discussed in block 33 of FIG. 3.

At block 41, it is determined if the geologic dip in the survey area is less than or greater than 10°. If the geologic dip is less than 10°, then the process continues on to block 42. If the geologic dip is greater than or equal to 10°, then the process continues on to block 44.

At block 42, the process goes to block 51 of FIG. 5 to determine an arrival angle $\phi(t)$ from a recording time t from velocity analysis appropriate for a geologic dip less than 10°.

At block 43, the process returns from block 58 of FIG. 5 with an arrival angle $\phi(t)$. Then, the process ends.

At block 44, the process goes to block 61 of FIG. 6 to determine an in-line arrival angle $\phi(t)$ from a recording time t from velocity analysis appropriate for a geologic dip greater than or equal to 10°. This in-line arrival angle is the projection of the actual arrival angle on to the vertical plane passing through the trace's shot point and receiver locations.

At block 45, the process returns from block 68 of FIG. 6 with an in-line arrival angle $\phi(t)$.

At block 46, it is determined if there is geologic dip that is perpendicular to the source-to-receiver line. If there is geologic dip in the direction perpendicular to that line, then the process goes to block 47 to determine an arrival angle $\alpha$. If not, then the process ends.

At block 47, the process goes to block 71 of FIG. 7 to determine an arrival angle α from a recording time t from velocity analysis appropriate for a geologic dip perpendicular to the source-to-receiver line.

At block 48, the process returns from block 75 of FIG. 7 with an arrival angle α.

Figure 8:
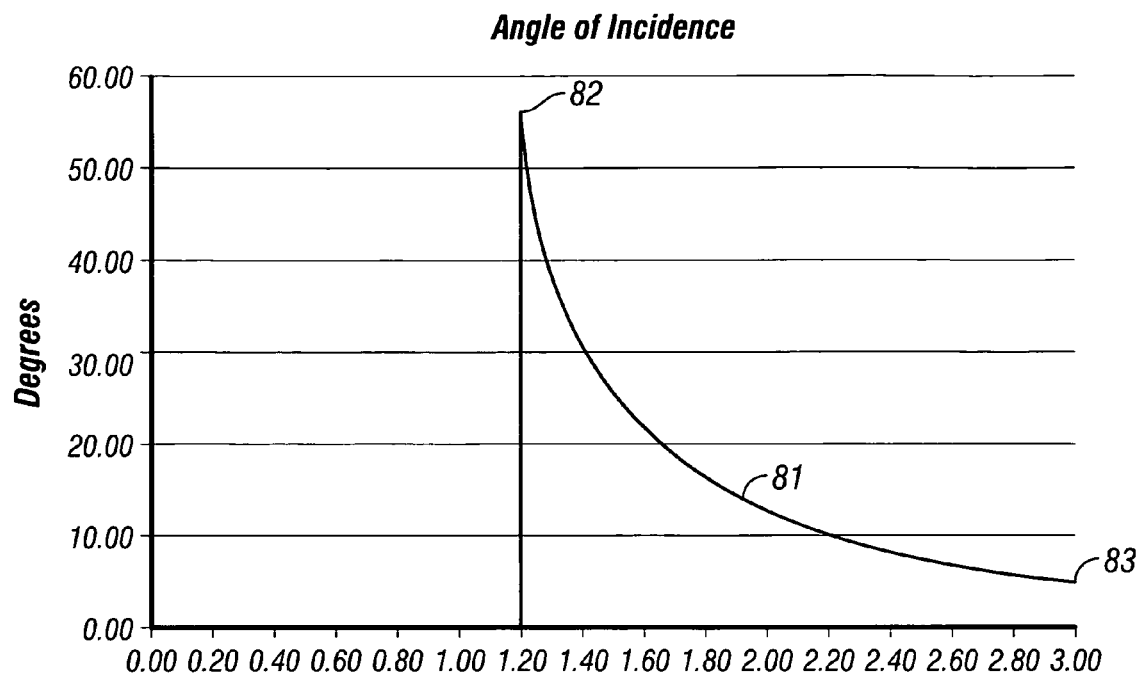
FIG. 8 is a graph of the vertical arrival angle as a function of recording time, $\phi(t)$.
Figure 9:
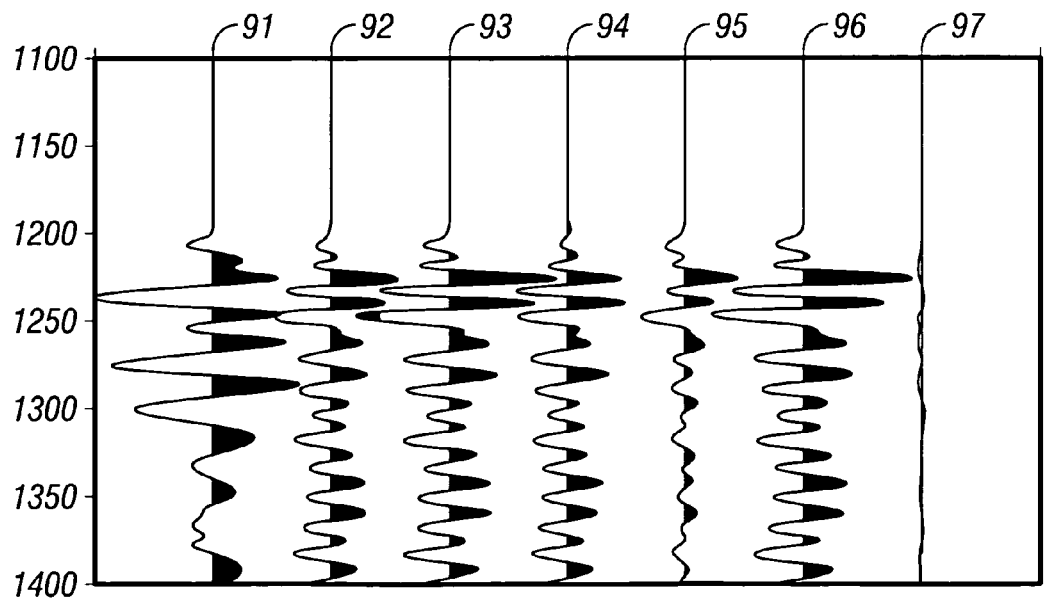
FIG. 9 is a section of pressure and vertical particle velocity synthetic traces.
Figure 10:
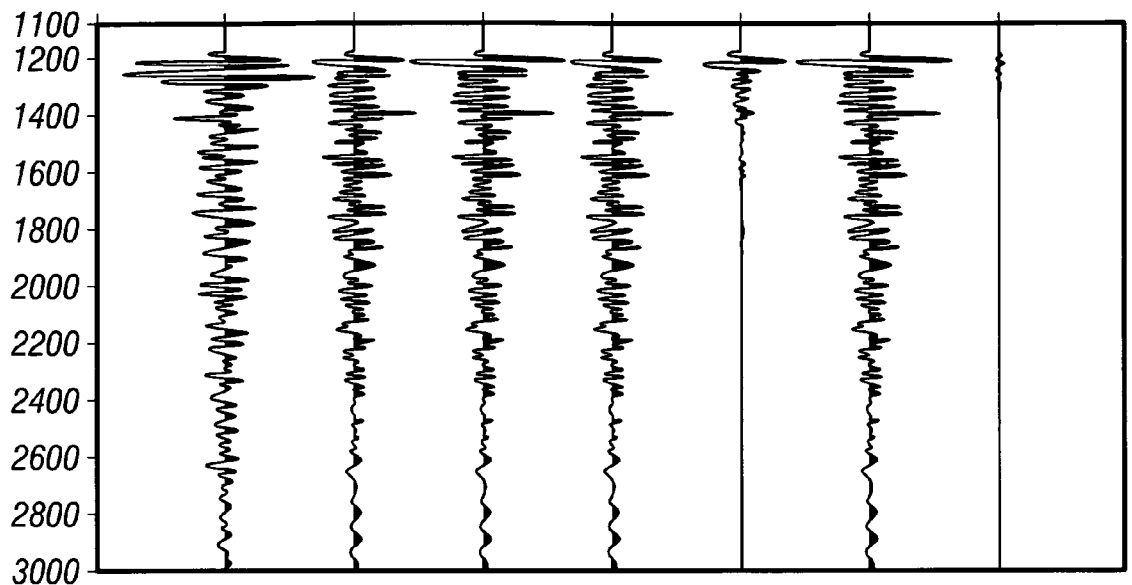
FIG. 10 is a section of the synthetic traces shown in FIG. 9 shown down to 3.0 seconds.
Figure 11:
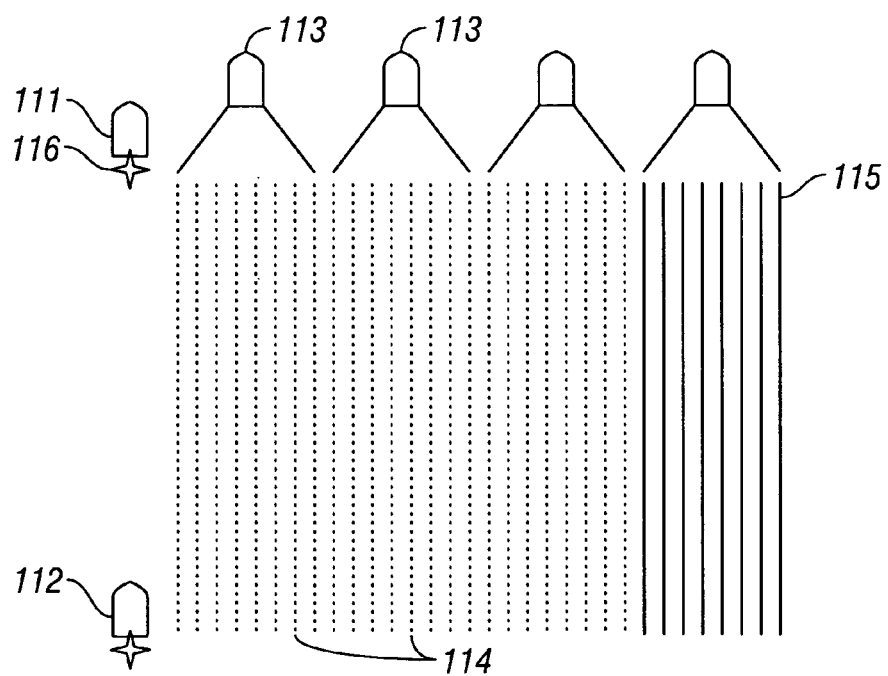
FIG. 11 is a plan view of a shooting geometry used in wide-azimuth marine data acquisition.
Figure 12:
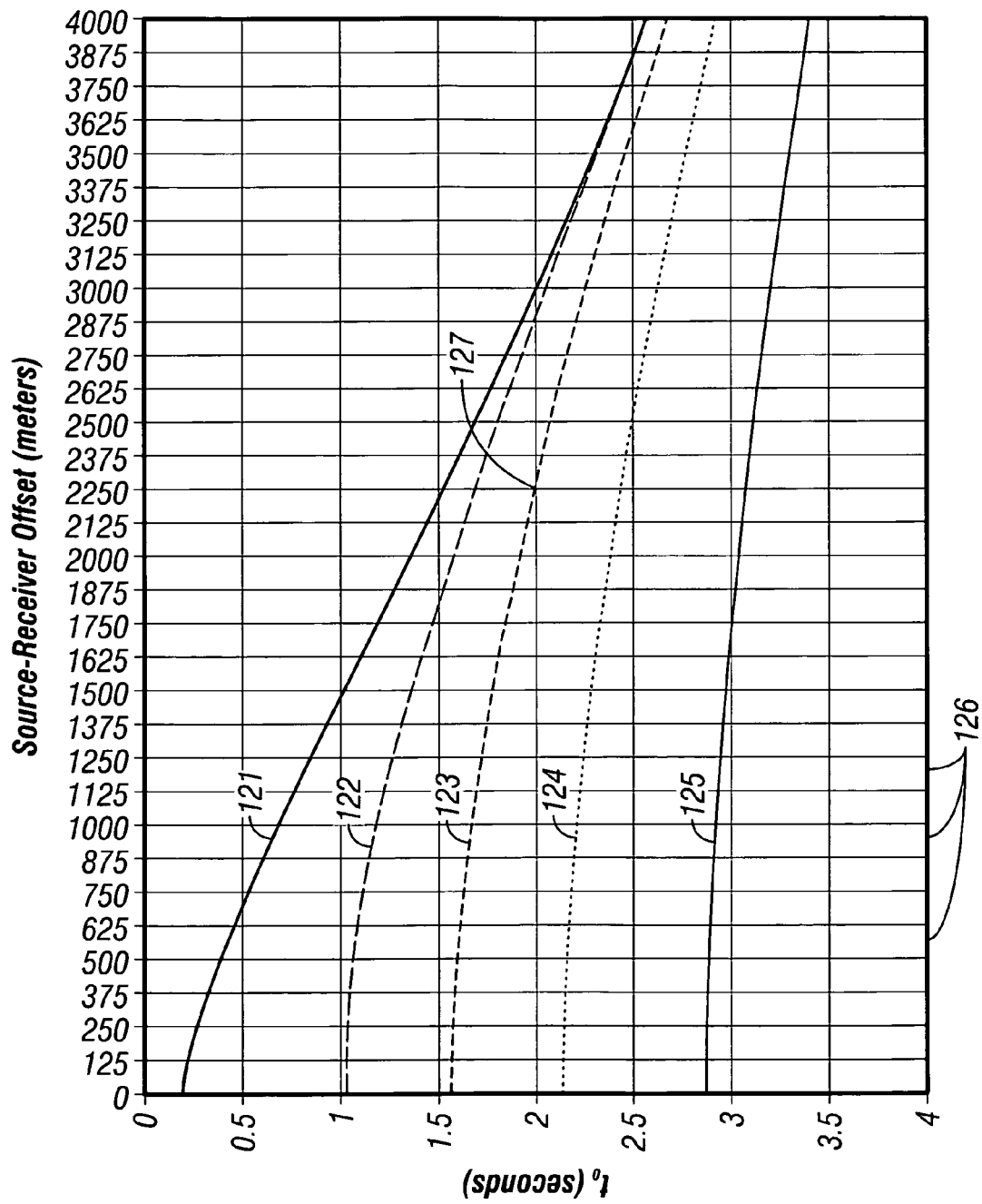
FIG. 12 is a graph of arrival times of five reflection events across 32 traces of increasing offset.
Figure 13:
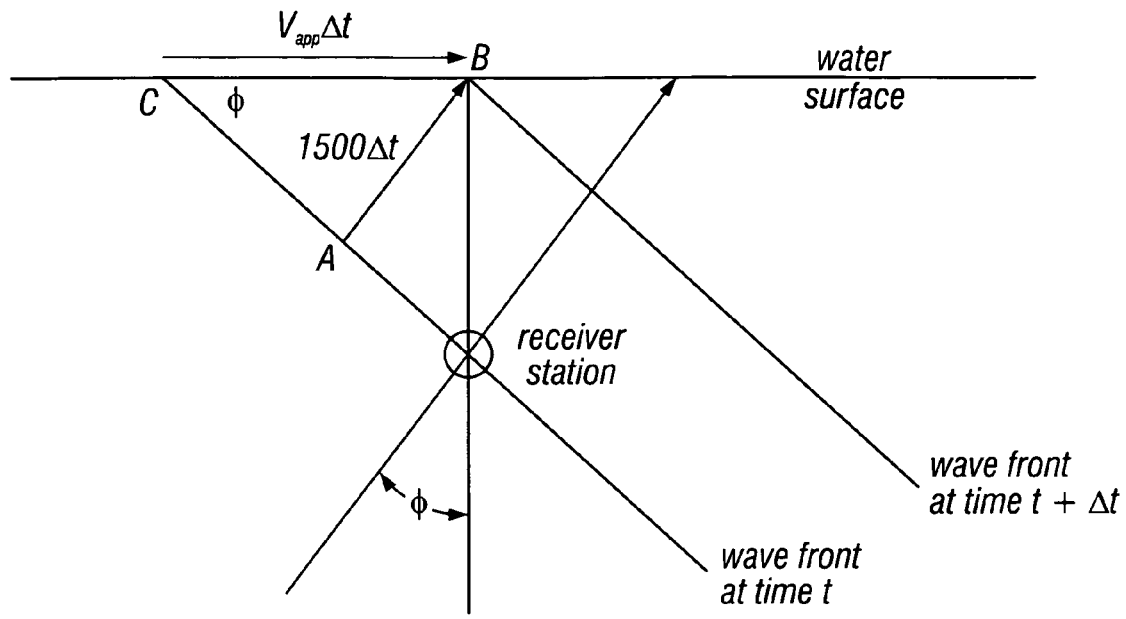
FIG. 13 is a first schematic side view of a sound wave at angle of arrival.
Figure 14:
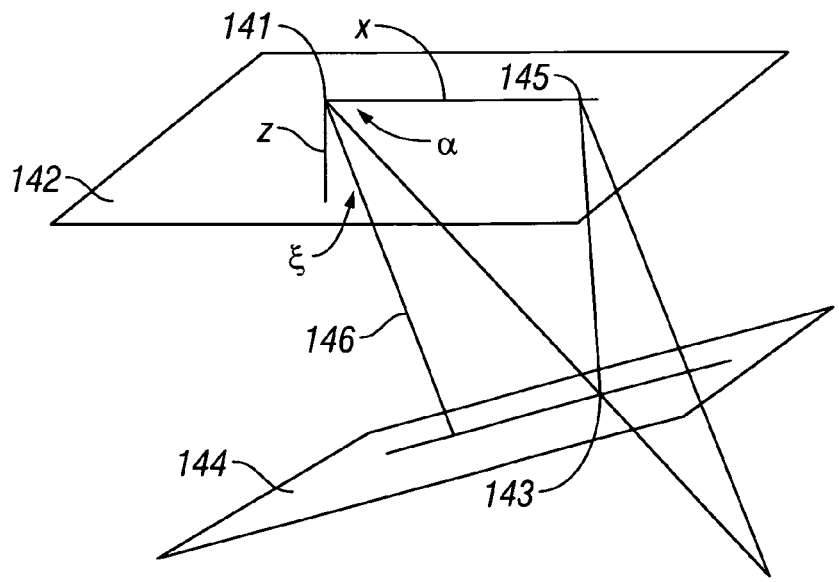
FIG. 14 is a second schematic side view of a sound wave at an angle of arrival.
Figure 15:
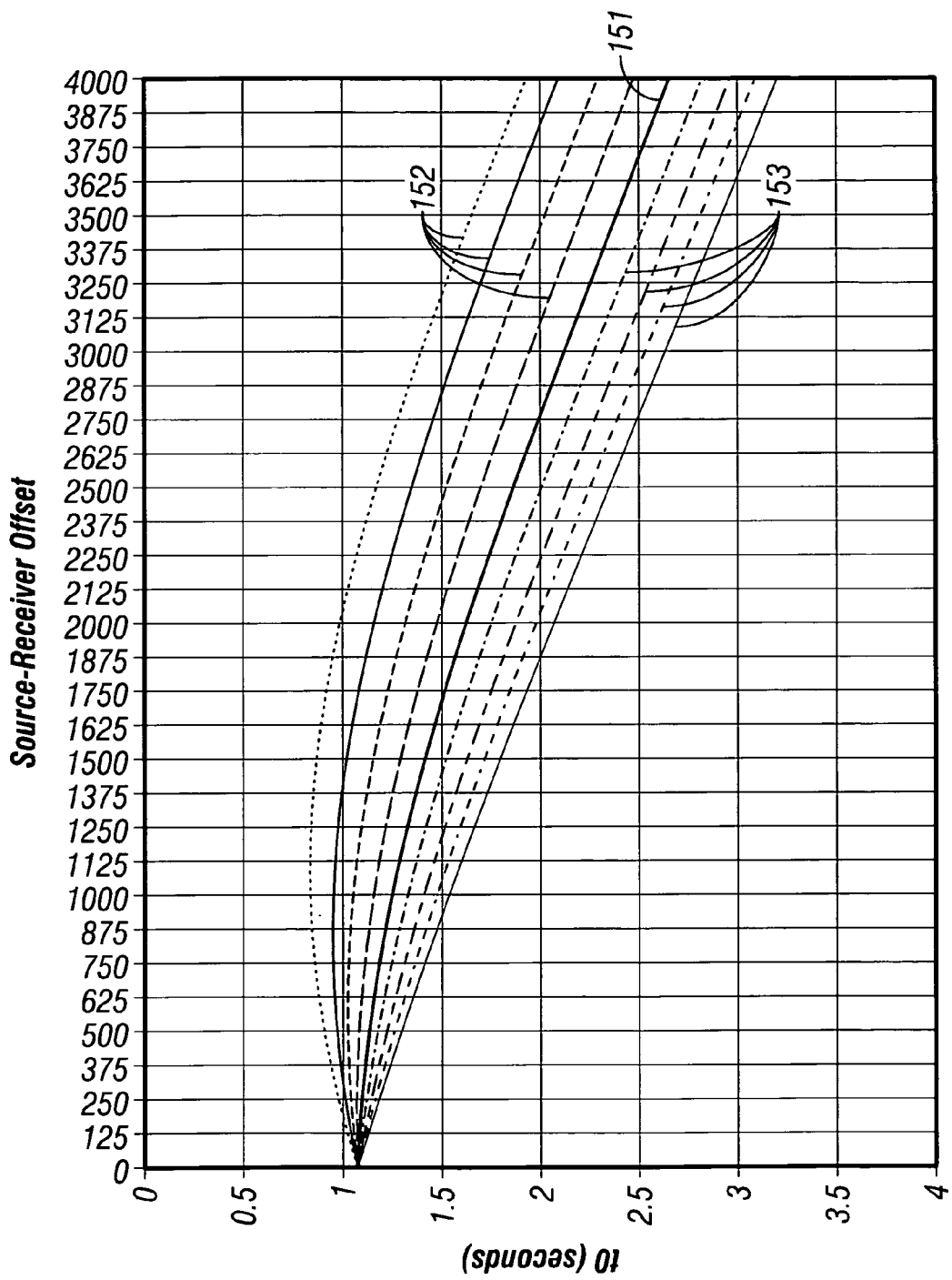
FIG. 15 is a graph of arrival times for the second reflection event in FIG. 12.
Figure 16:
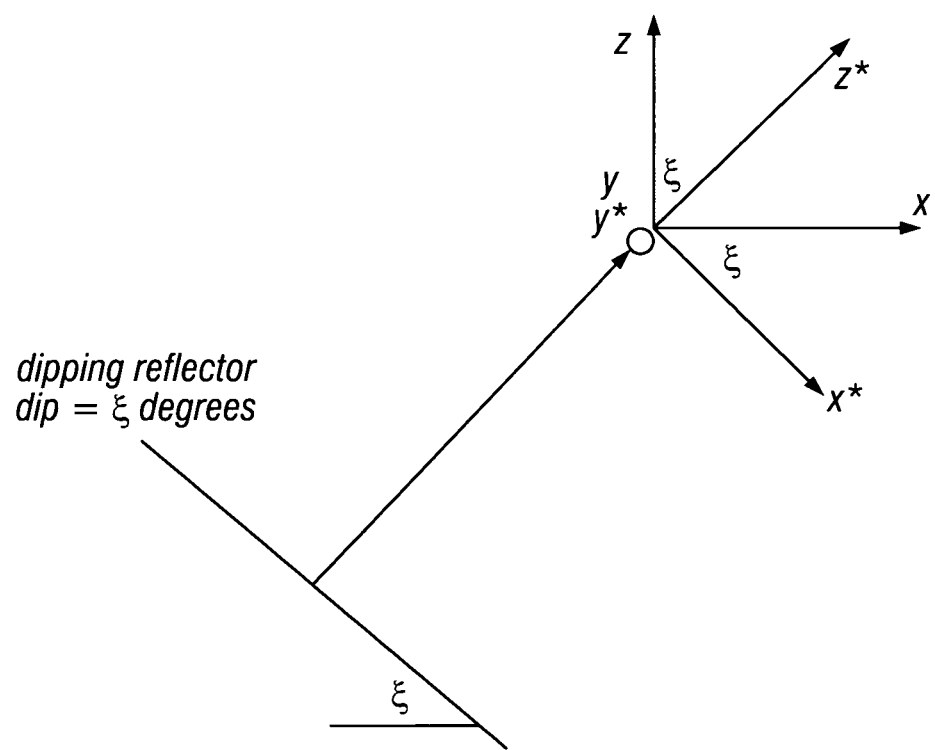
FIG. 16 is a schematic side view of a reflector with a dip perpendicular to the line from source to receiver.

FIGS. 8-16 show graphs, sections, and views that illustrate the embodiments of the invention discussed with reference to the flowcharts in FIGS. 1-7. FIGS. 8-10 illustrate elements of velocity analysis with synthetic seismic traces. FIGS. 11-13 illustrate elements of velocity analysis for a first type of geologic dip. FIGS. 14-15 illustrate elements of velocity analysis for a second type of geologic dip. FIG. 16 illustrates elements of velocity analysis for a third type of geologic dip.

FIG. 8 graphically displays the arrival angle φ(t) 81 in a vertical plane as a function of recording time t for the synthetic traces displayed in FIG. 9. The shot-to-receiver offset of the pressure and vertical particle velocity traces of FIG. 9 is 1500 meters, and the water depth is 500 meters. It can be seen that the vertical angles of incidence 81 range from about 57 degrees at 1.20 seconds 82 (the water bottom reflection) to about 5 degrees at 3.0 seconds 83.

FIG. 9 is a section of pressure and vertical particle velocity synthetic traces. The first trace 91 of FIG. 9 is the synthetic pressure trace computed using a minimum phase air gun wavelet for each reflector, random reflection coefficients, ghosting time delays corresponding to the arrival angles of FIG. 8 and a streamer depth of 15 meters. The second trace 92 is the corresponding vertical particle velocity trace. Note that the amplitudes of this vertical particle velocity trace 92 are lower than those of the pressure trace 91 because of the large non-vertical arrival angles of the first reflections. Also note that there is no strong, low-frequency noise that would typically corrupt an actual particle velocity signal from a dual-sensor streamer. This noise is omitted to better evaluate the effectiveness of this method.

The third trace 93 represents a perfectly corrected vertical particle velocity trace, ready for summing with the pressure trace 91 to eliminate all surface ghost reflections. The fourth trace 94 is the result of simply computing the low-frequency portion of the particle velocity trace's spectrum from that of the first trace 91, assuming that all reflection wavelets arrive vertically, and merging it with the rest of the second trace's 92 spectrum. The computation was performed between 1 and 35 Hz, and the computed and actual spectra were merged between 25 and 35 Hz.

The fifth trace 95 is the error in this result, i.e. the third trace 93 minus the fourth trace 94. It can be seen that the early errors are very large. There are two sources of these errors. The first is that no corrections in amplitudes were applied to the particle velocity trace for non-vertical arrival. The second is that incorrect ghost reflection time delays were used when the low-frequency part of the particle velocity trace's spectrum was computed from the pressure signal spectrum, using equation (1), and replaced.

The sixth trace 96 is the resulting composite particle velocity trace of this method, as described above, and the seventh trace 97 is the error in that result (the third trace 93 minus the sixth trace 96). It can be seen that the error trace is very small, and that the disclosed method yields very accurate results. FIG. 10 is a section of the synthetic traces shown in FIG. 9 shown down to 3.0 seconds.

Next, velocity analysis for field data will be considered. First, a method for determining arrival angle φ(t) in survey areas with geologic dips less than 10° will be discussed.

Recording wide-azimuth marine data significantly improves the quality of imaged seismic data below complex salt bodies. Such data sets are recorded using a separate source vessel or vessels placing shots along lines that are parallel to the towed streamers, but are laterally displaced from them by as much as several thousand meters.

FIG. 11 is a plan view of a shooting geometry used in wide-azimuth marine data acquisition. Two source vessels 111, 112 are placing shot points along a line parallel to four separate passes of the streamer vessel 113 over the survey area. The eight towed streamers 114 were spaced apart by 125 meters, so the span of recording stations in the cross-streamer direction for each shot line was 4000 meters. Shots were alternated between the fore and aft shooting vessels 111, 112, and the same shot line was repeated four times, once for each of the illustrated passes of the streamer vessel 113. Once completed, the location of the shot line and the passes of the streamer vessel 113 were shifted by 250 meters in the cross-streamer direction.

For wide-azimuth recording geometries such as the example illustrated in FIG. 11, the receiver station spacing along each streamer is quite close (typically 12.5 meters), and there is no spatial aliasing problem in that dimension. However, in the cross-streamer direction, the data are severely spatially aliased by the 125 meter streamer spacing, and methods, such as, for example, that of Vaage et al. will break down.

FIG. 12 illustrates the arrival times of five reflection events (reference numerals 121 to 125) that might be recorded from receiver station 1 115 (in FIG. 11) in each streamer (the receiver stations closest to the streamer vessel) as a result of the four shots at the shot point illustrated by the "star" 116 (in FIG. 11) behind the forward shooting boat 111 (in FIG. 11). There are, therefore, 32 traces (the vertical lines) 126 with source-to-receiver distances (offsets) ranging from 125 to 4000 meters.

Note that, for instance, the slope of the third reflection event 123, where it intersects the trace with source-receiver offset 2250 meters at a time of about 2.0 seconds 127, indicates the apparent-horizontal velocity at which that event was propagating when it arrived at that receiver station. In this case, that slope and apparent horizontal velocity was about 3021 meters/second. The knowledge of this event's apparent horizontal velocity allows the computation of its arrival angle φ at this receiver station. This can be explained using FIG. 13, which is a schematic side view of a sound wave at a non-vertical arrival angle.

FIG. 13 depicts a sound wave arriving at a receiver station from below at an angle of φ degrees from vertical. It can be seen that in the time, Δt, it takes the wave front to travel from point A to point B (the product of the speed of sound waves in water, 1500 meters/second, and Δt), the wave front has traveled the horizontal distance from points C to B, equal to the product of the wave front's apparent horizontal velocity, $v_{app}$, and Δt. From the right triangle formed by points A, B and C, it can be seen that $$\sin(\phi) = \frac{c\Delta t}{v_{app}\Delta t} = \frac{c}{v_{app}}. \tag{3}$$

where c=speed of sound in water=1500 m/s.
It follows from Equation (3) that φ is given by:

$$\phi = \arcsin\left(\frac{c}{v_{app}}\right). \tag{4}$$

For the event 123 of FIG. 12 at 2.0 seconds, Equation (4) gives the angle of arrival from vertical, φ, at the recording station with source-receiver offset of 2250 meters as:

$$\phi = \arcsin\left(\frac{1500}{3021}\right) = 29.8°.$$

An arrival angle $\phi(t)$ for each recorded time sample on each recorded trace is needed. Fortunately, the equation of the loci of events such as the five reflection events depicted in the x-t plane of FIG. 12 is known. The equation is that of a hyperbola, which for small geologic dips is given by:

$$t^2 = t_0^2 + \left[\frac{x}{v(t_0)}\right]^2, \quad (5)$$

where t is recording time; $t_0$ is zero-offset intercept of the hyperbola; x is source-to-receiver offset; and $v(t_0)$ is a velocity function, as a function of zero-offset time $t_0$, that best describes the hyperbolic moveout of the reflection events in the traces of FIG. 12.

The velocity function, $v(t_0)$, is determined from the data traces using well known velocity scanning and interpretation methods. However, the analyses are preferably performed on common-shot gathers of traces rather than common-midpoint gathers. It is advantageous to use the recorded pressure traces for these analyses because their signal-to-noise ratio is almost always superior to that of the vertical particle velocity traces.

FIG. 5 is a flowchart illustrating an embodiment of the invention for determining arrival angles for geologic dip less than 10°. FIG. 5 illustrates in more detail a portion of the invention discussed in block 33 of FIG. 3. In particular, the process comes here to FIG. 5 from block 42 of FIG. 4 to calculate an arrival angle and returns to block 43 of FIG. 4 with the calculated arrival angle.

At block 51, velocity analysis is performed to determine a velocity function for the reflection events on the seismic trace extracted in block 31 of FIG. 3. In a particular embodiment, the velocity function is determined as pairs $v(t_0)$ of velocity and zero-offset time $t_0$ for hyperbolic functions that best describes the hyperbolic moveout of the reflection events in the offset-time (x,t) domain.

At block 52, a receiver-to-source offset x is selected for the seismic trace.

At block 53, a time sample is selected on the seismic trace.

At block 54, the pair $v(t_0)$ of velocity and zero-offset time $t_0$ describing the velocity function from block 51 is determined that defines the hyperbolic function that intersects the seismic trace at the time sample selected in block 53. This hyperbolic function represents a reflection event arriving at this time sample.

At block 55, a recording time t is calculated for the time sample selected in block 53. The recording time t is calculated from the velocity function determined in block 51. In one embodiment, the recording time t is calculated from the offset x from block 52 and the pair $v(t_0)$ of the velocity and the zero-offset time $t_0$ from block 54. In this particular embodiment, the recording time t can be calculated by taking the square root of Equation (5):

$$t = \sqrt{t_0^2 + \frac{x}{v(t_0)^2}}. \quad (6)$$

At block 56, an apparent velocity $v_{app}(t)$ is calculated for the reflection event in block 54 arriving at the time sample from block 53. In one embodiment, the apparent velocity $v_{app}(t)$ is calculated from the offset x from block 52, the velocity $v(t_0)$ from block 54, and the recording time t calculated in block 55. In this particular embodiment, the slope of the curves for the reflection events in FIG. 5 and, therefore, the apparent horizontal velocity for each recorded time t on a seismic trace with offset x is found by first computing the derivative of Equation (5), yielding:

$$2tdt = \frac{2xdx}{v(t_0)^2}. \quad (7)$$

Then, rearranging the terms in Equation (7) gives the apparent velocity $v_{app}(t)$:

$$v_{app}(t) = \frac{dx}{dt} = \left(\frac{t}{x}\right)v(t_0)^2. \quad (8)$$

At block 57, an arrival angle $\phi(t)$ is calculated for the time sample t from block 53. In one embodiment, the arrival angle $\phi(t)$ is calculated from speed of sound in the medium c and the apparent velocity $v_{app}(t)$ calculated in block 56. In one particular embodiment, the arrival angle $\phi(t)$ is calculated from Equation (4):

$$\phi(t) = \arcsin\left(\frac{c}{v_{app}(t)}\right).$$

At block 58, the process returns to block 43 of FIG. 4 with the arrival angle $\phi(t)$ calculated in block 56.

Next, a method for determining $\phi(t)$ in survey areas with geologic dips greater than 10° will be discussed. FIG. 14 is a second schematic side view of a sound wave at a non-vertical angle of arrival. Levin, F. K., in his 1971 article, "Apparent velocity from dipping interface reflections", *Geophysics*, Vol. 36, No. 3, pp. 510-516, performed an analysis of the effect of geologic dip on the stacking velocities computed from common-midpoint trace gathers. However, Levin started with the equation for the travel time from a shot point 141 on a surface 142 to a reflection point 143 on a dipping bed 144 to a receiver station 145 x meters from the shot point 141. That equation is:

$$v(t_0)^2 t^2 = 4d^2 + x^2 - 4dx\cos(\alpha), \quad (9)$$

where d is distance along the line 146 from the shot point 141 to the reflecting surface 144, perpendicular to that reflecting surface 144, and $\alpha$ is angle between the horizontal plane of the surface 142 and the line 146 representing the distance d.

The geometry of FIG. 14 shows that $\cos(\alpha)$ is equal to $\sin(\xi)$, where $\xi$ is the component of dip in the direction from the shot point to the receiver. Further, $\xi$ is positive if the receiver is up dip from the shot point, and $\xi$ is negative if down dip. (Levin used $\phi$ instead of $\xi$ to represent the reflecting bed's dip angle).

Rearranging the terms of Equation (9), and recognizing that $$\frac{2d}{v(t_0)} = t_0,$$

the zero-offset reflection time, leads to:

$$t^2 = t_0^2 + \left[\frac{x}{v(t_0)}\right]^2 - \frac{t_0 2x\sin(\xi)}{v(t_0)}. \quad (10)$$

Equation (10) describes the locus of arrival times for a reflection event from a dipping reflector in a common-shot gather of traces. Note that for small values of dip, $\xi$, $\sin(\xi)$ in the last term is very small or zero, so Equation (10) becomes essentially identical to Equation (5).

FIG. 15 contains plots of this curve of Equation (10) for the second reflection event 122 of FIG. 12 ($t_0$=1.04 seconds, $v(t_0)$=1700 m/s) for dip angles $\xi$ ranging from −400 to +40° by 10° increments. The middle curve 151 corresponds to dip angle $\xi$=0. It can be seen that, for positive dip angles 152 (i.e. receivers up dip from the shot point), the apexes of the hyperbolas are shifted to positive source-receiver distances. For negative dip angles 153, the opposite is true, although negative source-receiver distances are not plotted in FIG. 15.

It can be seen that, in the presence of geologic dips greater than 10°, the velocity scanning algorithm used on common-shot position trace gathers needs to use Equation (10) and include an additional parameter, dip angle $\xi$. These analyses should also be performed in a shot-receiver azimuth-dependent manner, and the resulting velocity functions used in the same manner. Such velocity analyses can be performed sparsely over the survey area (e.g. at shot point locations spaced every four kilometers in the streamer and cross-streamer directions) and linearly interpolated between.

FIG. 6 is a flowchart illustrating an embodiment of the invention for determining an arrival angle for geologic dip greater than 10°. FIG. 6 illustrates in more detail a portion of the invention discussed in block 33 of FIG. 3. In particular, the process comes here to FIG. 6 from block 44 of FIG. 4 to calculate an arrival angle and returns to block 45 of FIG. 4 with the calculated arrival angle.

At block 61, velocity analysis is performed to determine a velocity function for the reflection events on the seismic trace extracted in block 31 of FIG. 3. In a particular embodiment, the velocity function is determined as sets of velocity $v(t_0)$, zero-offset time $t_0$, and dip angle $\xi$ for hyperbolic functions that best describes the hyperbolic moveout of the reflection events in the offset-time (x,t) domain.

At block 63, a time sample is selected on the seismic trace.

At block 64, the set of velocity $v(t_0)$, zero-offset time $t_0$, and dip angle $\xi$ describing the velocity function from block 61 is determined that defines the hyperbolic function that intersects the seismic trace at the time sample selected in block 63. This hyperbolic function represents a reflection event arriving at this time sample.

At block 65, a recording time t is calculated for the time sample selected in block 63. The recording time t is calculated from the velocity function determined in block 61. In one embodiment, the recording time t is calculated from the offset x from block 62 and the set of velocity $v(t_0)$, zero-offset time $t_0$, and dip angle $\xi$ from block 64. In this particular embodiment, the recording time t can be calculated by taking the square root of Equation (10).

With the velocity function specified by the parameters $t_0$, $v(t_0)$ and $\xi$, for each trace with offset x and each value of $t_0$, t is computed from Equation (10) as:

$$t = \sqrt{t_0^2 + \frac{x^2}{v(t_0)^2} - \frac{t_0 2x\sin(\xi)}{v(t_0)}}. \tag{11}$$

At block 66, an apparent velocity $v_{app}(t)$ is calculated for the reflection event in block 64 arriving at the time sample from block 63. In one embodiment, the apparent velocity $v_{app}(t)$ is calculated from the from the offset x from block 62, the set of velocity $v(t_0)$, zero-offset time $t_0$, and dip angle $\xi$ from block 64, and the recording time t calculated in block 65. In this particular embodiment, the apparent velocity $v_{app}(t)$ is calculated from the slope of the curve of Equation (10), to determine the apparent horizontal velocity of a reflection event arriving at a receiver station. The slope is calculated by taking the derivative of Equation (10)), yielding:

$$2tdt = \frac{2xdx}{v(t_0)^2} - \left[\frac{t_0 2\sin(\xi)}{v(t_0)}\right]dx. \tag{12}$$

Then, rearranging the terms in Equation (12) gives the apparent velocity $v_{app}(t)$:

$$v_{app}(t) = \frac{dx}{dt} = \frac{tv(t_0)^2}{x - t_0 v(t_0)\sin(\xi)}. \tag{13}$$

At block 67, an arrival angle $\phi(t)$ is calculated for the time sample t from block 63. In one embodiment, the arrival angle $\phi(t)$ is calculated from speed of sound in the medium c and the apparent velocity $v_{app}(t)$ calculated in block 66. In one particular embodiment, the arrival angle $\phi(t)$ is calculated from Equation (4):

$$\phi(t) = \arcsin\left(\frac{c}{v_{app}(t)}\right).$$

At block 68, the process returns to block 45 of FIG. 4 with the arrival angle $\phi(t)$ calculated in block 67.

Next, a method accounting for geologic dips perpendicular to the source-to-receiver line will be discussed. Recall that FIG. 12 illustrates the arrival times of five reflection events that might be recorded from receiver station 1 in each streamer (the receiver stations closest to the streamer vessel) as a result of the four shots at the shot point illustrated by the star 116 behind the forward shooting boat 111 in FIG. 11. These curves are valid if there's little or no geologic dip along the line from that shot point to those receiver locations. Curves like those in FIG. 15 apply if there is significant dip along that line. However, even though the shapes of those curves would not be influenced if one or more of the reflectors had dip in a direction perpendicular to the line from that shot point to those receivers, the angle of arrival at the receivers would be affected. This can be understood, and the correction derived, with the help of FIG. 16.

FIG. 16 is a schematic side view of a reflector with a dip perpendicular to the line from source to receiver. FIG. 16 depicts a reflector with dip equal to $\xi$ degrees in a direction perpendicular to the y axis (the small circle) which runs in and out of the plane of the page. The y axis is the line connecting the shot point location and the receivers depicted in FIGS. 12 and 15. The arrow perpendicular to and extending from the dipping reflector to the y axis depicts one of the reflection ray paths from the shot point to the receiver locations. Also shown are the x axis and z axis, as well as their counterparts, x* and z* which have been rotated $\xi$ degrees around the y axis to make the z* axis lie in the plane that is perpendicular to of the reflector and contains the y* axis and the ray paths from the shot point to the reflector and to the receivers. Therefore, there are two Cartesian coordinate systems displayed, x y z and x* y* z* wherein the y axis and y* axis are identical.

Using the analysis described in the previous section, a particular reflection event might appear to arrive at a receiver station with an arrival angle from vertical of $\phi$ degrees. However, the effect on its arrival angle of a ray path which lies in the above described plane, which contains the y axis and is perpendicular to the dipping reflector of FIG. 8, has not been accounted for.

The arriving reflection event represented in FIG. 16 can be expressed in classic vector notation by a unit vector a*, expressed in the x* y* z* coordinate system as:

$$a^* = v_1^* i^* + v_2^* j^* + v_3^* k^* \quad (14)$$
$$= 0 i^* + \sin(\phi) j^* + \cos(\phi) k^*$$

where i*, j* and k* are the unit direction vectors for the x*, y* and z* axes, respectively. By definition, a unit vector has length, or absolute value, equal to 1. The second line of Equation (14) is determined by the geometry of FIG. 16.

To determine the angle between this vector and the z axis of the x y z coordinate, we must perform a vector transformation from the x* y* z* coordinate system to the x y z system where it will be expressed by the vector a given by:

$$a = v_1 i + v_2 j + v_3 k \quad (15)$$

Using well known coordinate transformation equations, $$a = A a^* \quad (16)$$

or $$\begin{bmatrix} v_1 \\ v_2 \\ v_3 \end{bmatrix}^T = \begin{bmatrix} a_{11} & a_{21} & a_{31} \\ a_{12} & a_{22} & a_{32} \\ a_{13} & a_{23} & a_{33} \end{bmatrix} \begin{bmatrix} v_1^* \\ v_2^* \\ v_3^* \end{bmatrix} = \begin{bmatrix} a_{11} v_1^* + a_{21} v_2^* + a_{31} v_3^* \\ a_{12} v_1^* + a_{22} v_2^* + a_{32} v_3^* \\ a_{13} v_1^* + a_{23} v_2^* + a_{33} v_3^* \end{bmatrix}.$$

The vector dot (or inner) product of two vectors, such as d and e, is defined as $$d \cdot e = |d||e|\cos(\theta) \quad (17)$$

where the dot "•" designates the dot product, "|•|" designates absolute value of the vector d or e, and θ is the angle between the two vectors d and e. Equation (17) is equivalent to:

$$d \cdot e = [d_1 d_2 d_3]^T \cdot [e_1 e_2 e_3]^T = d_1 e_1 + d_2 e_2 + d_3 e_3. \quad (18)$$

The values of the elements $a_{ij}$ for the coordinate transformation matrix A are given by dot products of the unit direction vectors for the two coordinate systems, as:

$$A = \begin{bmatrix} i^* \cdot i & i^* \cdot j & i^* \cdot k \\ j^* \cdot i & j^* \cdot j & j^* \cdot k \\ k^* \cdot i & k^* \cdot j & k^* \cdot k \end{bmatrix}. \quad (19)$$

Using the geometry of FIG. 16 to evaluate the values of the dot products of the unit direction vectors in Equation (19) gives:

$$A = \begin{bmatrix} \cos(\xi) & 0 & -\cos(90-\xi) \\ 0 & 1 & 0 \\ \cos(90-\xi) & 0 & \cos(\xi) \end{bmatrix} \quad (20)$$

Therefore, substituting the values for $a_{ij}$ from Equation (20) and the values for $v_i^*$ from Equation (14) into Equation (16) gives:

$$v_1 = 0 + 0 + \cos(90-\xi)\cos(\phi) = \cos(90-\xi)\cos(\phi)$$

$$v_2 = 0 + \sin(\phi) + 0 = \sin(\phi)$$

$$v_3 = 0 + 0 + \cos(\xi)\cos(\phi) = \cos(\xi)\cos(\phi)$$

and so, Equation (15) becomes, $$a = \cos(90-\xi)\cos(\phi) i + \sin(\phi) j + \cos(\xi)\cos(\phi) k \quad (21)$$

The arrival angle, α, between this unit vector, a, and the unit direction vector for the z axis, k, can be obtained by combining the two equivalent forms for the vector dot product in Equations (17) and (18), yielding:

$$a \cdot k = |a||k|\cos(\alpha) = \cos(\alpha) \quad (22)$$
$$= 0 + 0 + \cos(\xi)\cos(\phi) = \cos(\xi)\cos(\phi)$$

Here, the first line follows from the definition of unit vectors, wherein |a|=1=|k|, and the second line follows from the form of a given in Equation (21). Equation (22) will yield the true arrival angle α.

FIG. 7 is a flowchart illustrating an embodiment of the invention for determining an arrival angle when there are geologic dips perpendicular to the source-to-receiver line. FIG. 6 illustrates in more detail a portion of the invention discussed in block 33 of FIG. 3.

At block 71, a dip angle ξ is determined for reflection events on a seismic trace. The dip angle ξ is determined from another common shot gather velocity analysis in the survey area wherein the line from its shot point location to this receiver location is approximately perpendicular.

At block 72, a recording time t is calculated for the reflection events on the seismic trace. The recording time t here in block 72 and the partial arrival angle ϕ(t) below in block 73 may be obtained from the procedure described with regard to the discussion of the flowcharts in either of FIG. 5 or 6, depending upon whether the geologic dip is less than or greater than 10°, respectively.

At block 73, a partial arrival angle ϕ(t) is calculated for the recording time t from block 72. The recording time t above in block 72 and the partial arrival angle ϕ(t) here in block 73 may be obtained from the procedure described with regard to the discussion of the flowcharts in either of FIG. 5 or 6, depending upon whether the geologic dip is less than or greater than 10°, respectively.

At block 74, a true arrival angle α is determined from the dip angle ξ from block 71 and the partial arrival angle ϕ(t) from block 72. In a particular embodiment, the true arrival angle α is calculated from Equation (22) as:

$$\alpha = \arccos[\cos(\xi)\cos(\phi(t))].$$

At block 75, the process returns to block 48 of FIG. 4 with the arrival angle α calculated in block 74.

Adding geologic dip as a scanned variable to the common-shot-gather velocity analysis algorithm yields more accurate results in survey areas with significant geologic dip. However, not doing so still yields corrected particle velocity traces that are more accurate than applying the method such as, for example, that of Vaage et al. in the (f,$k_x$) domain when there is an appreciable offset in the (cross-line) direction between the receivers and the shot point relative to the offset in the (in-line) direction along the streamers. Using a standard stacking velocity or DMO velocity field, while less accurate still, will also result in improved results in these shot-receiver geometry situations.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant

I claim:

1. A method for combining pressure and vertical particle velocity signals in dual-sensor towed streamers, comprising:
    obtaining the pressure and vertical particle velocity signals recorded at a receiver station in the dual-sensor towed streamers, the signals representative of characteristics of subsurface earth formations and acquired by deployment of a plurality of seismic receivers overlying an area of the subsurface earth formations to be evaluated, the seismic receivers generating at least one of an electrical and optical signal in response to seismic energy;
    generating a merged particle velocity signal by merging the vertical particle velocity signal recorded at the receiver station, scaled in an upper frequency range using a time-dependent arrival angle as determined by velocity analysis, with a simulated particle velocity signal, calculated in a lower frequency range from the pressure signal recorded at the receiver station using a time-varying filter based on the time-dependent arrival angle; and
    generating combined pressure and vertical particle velocity signals, useful for imaging the earth's subsurface, by combining the recorded pressure and merged particle velocity signals.

2. The method of claim 1, wherein the generating a merged particle velocity signal comprises:
    recording pressure signals h(t) and vertical particle velocity signals g(t) at a receiver station in the towed streamer;
    temporally-transforming the recorded pressure signals h(t) and vertical particle velocity signals g(t) from a time domain to H($\omega$) and G($\omega$), respectively, in a frequency domain;
    selecting a set of arrival angles $\{\phi_j\}$;
    performing the following for each of the selected set of arrival angles $\{\phi_j\}$:
        selecting an arrival angle $\phi_j$, from the set of arrival angles $\{\phi_j\}$;
        calculating a particle velocity signal in a lower frequency range from the transformed pressure signal H($\omega$) for the selected arrival angle $\phi_j$, thereby generating a simulated particle velocity signal $G_j^{calc}(\omega)$ in the lower frequency range;
        scaling the transformed vertical particle velocity signal G($\omega$) in an upper frequency range for the selected arrival angle $\phi_j$, thereby generating a scaled vertical particle velocity signal $G_j^{scal}(\omega)$ in the upper frequency range;
        merging the simulated particle velocity signal $G_j^{calc}(\omega)$ from the lower frequency range with the scaled vertical particle velocity signal $G_j^{scal}(\omega)$ from the upper frequency range to generate a merged particle velocity signal $G_j^{merg}(\omega)$, for the selected arrival angle $\phi_j$; and
        inverse-transforming the merged particle velocity signal $G_j^{merg}(\omega)$ from the frequency domain to $g_j^{merg}(t)$ in the time domain.

3. The method of claim 2, wherein the temporal transform is a temporal Fourier transform.

4. The method of claim 2, wherein the set of arrival angles comprises the set of angles $\phi_j$=0°, 1°, 2°, ..., 60° degrees for j=0, 1, 2, ..., 60, respectively.

5. The method of claim 2, wherein the scaling comprises dividing the transformed vertical particle velocity signal G($\omega$) in the upper frequency range by cosine of the selected arrival angle $\phi_j$, generating a scaled vertical particle velocity signal $G_j^{scal}(\omega)$.

6. The method of claim 2, wherein a combination of the lower frequency range and the upper frequency range have substantially the same bandwidth as the bandwidth of the recorded pressure signal (h,t).

7. The method of claim 1, wherein the calculating a particle velocity signal $G_j^{calc}(\omega)$ in a low frequency range from a recorded pressure signal H($\omega$) for the selected arrival angle $\phi_j$ comprises applying the following equation:

$$G_j^{calc}(\omega) = \frac{1+Z_j}{1-Z_j} H(\omega),$$

for j=0, 1, 2, ..., 60, where $\omega$ is radial frequency in radians/second, equal to $2\pi f$ for temporal frequency f and $Z_j$ is a time delay operator.

8. The method of claim 7, wherein the time delay operator $Z_1$ is given by the equation:

$$Z_j = \exp[-i\pi\tau_j] = \cos(\omega\tau_j) - i\sin(\omega\tau_j),$$

for j=0, 1, 2, ..., 60, where $\tau_j$ is ghost reflection time delay.

9. The method of claim 8, wherein the ghost reflection time delay $\tau$ is given by:

$$\tau_j = \cos(\phi_j)\frac{2D}{c},$$

for j=0, 1, 2, ..., 60, where $\phi_j$ is the arrival angle, D is receiver depth and c is speed of sound in the medium.

10. The method of claim 2, wherein the generating combined pressure and vertical particle velocity signals comprises:
    extracting a seismic trace from the pressure signals h(t) and the vertical particle velocity signals h(t);
    extracting a time sample at a recording time t from the seismic trace;
    calculating an arrival angle $\phi$(t) at the recording time t in the time sample from the seismic trace, by velocity analysis;
    determining which arrival angle $\phi_j$ of the selected set of arrival angles $\{\phi_j\}$ is closest to the calculated arrival angle $\phi$(t); and
    combining a time sample of the recorded pressure signal h(t) with a time sample of the corresponding merged particle velocity signal $g_j^{merg}(t)$ that corresponds to the closest arrival angle $\phi_j$.

11. The method of claim 10, wherein the calculating an arrival angle $\phi$(t) at the recording time t in the time sample comprises applying the following equation:

$$\phi(t) = \arcsin\left(\frac{c}{v_{app}(t)}\right),$$

where c is the speed of sound in the medium and $v_{app}(t)$ is the apparent velocity.

12. The method of claim 11, wherein the apparent velocity $v_{app}(t)$ for the recording time t is calculated from the following equation:

$$v_{app}(t) = \left(\frac{t}{x}\right)v(t_0)^2$$

where x is source-to-receiver offset and $v(t_0)$ is a pair of velocity and zero-offset time $t_0$.

13. The method of claim 11, wherein the recording time t is computed from the following equation:

$$t = \sqrt{t_2^0 + \frac{x}{v(t_0)^2}}.$$

14. The method of claim 11, wherein the apparent velocity $v_{app}(t)$ for the recording time t is calculated from the following equation:

$$v_{app}(t) = \frac{tv(t_0)^2}{x - t_0 v(t_0)\sin(\xi)},$$

for a set of velocity $v(t_0)$, zero-offset time $t_0$, and dip angle $\xi$, and where x is source-to-receiver offset.

15. The method of claim 14, wherein the recording time t is computed from the following equation:

$$t = \sqrt{t_2^0 + \frac{x^2}{v(t_0)^2} - \frac{t_0 2x\sin(\xi)}{v(t_0)}}.$$

16. The method of claim 15, wherein an arrival angle α is computed from the following equation:

α=arccos [cos(ξ)cos(φ)].

17. The method of claim 14, wherein the dip angle is determined from another common shot gather velocity analysis in the survey area wherein the line from its shot point location to this receiver location is approximately perpendicular.

18. The method of claim 1, wherein the vertical particle velocity signals are obtained using accelerometers.

* * * * *